US008134480B2

(12) United States Patent
Onome et al.

(10) Patent No.: US 8,134,480 B2
(45) Date of Patent: Mar. 13, 2012

(54) IMAGE PROCESSING SYSTEM AND METHOD

(75) Inventors: Hirohisa Onome, Toyota (JP); Koji Watanabe, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 586 days.

(21) Appl. No.: 12/224,791

(22) PCT Filed: Mar. 2, 2007

(86) PCT No.: PCT/IB2007/000512
§ 371 (c)(1),
(2), (4) Date: Jan. 12, 2009

(87) PCT Pub. No.: WO2007/102065
PCT Pub. Date: Sep. 13, 2007

(65) Prior Publication Data
US 2009/0303077 A1 Dec. 10, 2009

(30) Foreign Application Priority Data
Mar. 6, 2006 (JP) .................................. 2006-060226

(51) Int. Cl.
*G08G 1/017* (2006.01)
(52) U.S. Cl. .................. 340/937; 340/905; 340/995.13; 348/148; 382/104; 701/209
(58) Field of Classification Search ............ 340/995.13–995.27, 903, 905, 340/937, 435; 348/148, 149, 170; 382/104, 382/170, 190; 180/169; 701/45, 200, 201, 701/96, 301, 209
See application file for complete search history.

(56) References Cited

U.S. PATENT DOCUMENTS

| 6,018,697 | A  | * | 1/2000 | Morimoto et al. ............ 701/209 |
| 6,191,704 | B1 |   | 2/2001 | Takenaga et al. |
| 6,266,442 | B1 |   | 7/2001 | Laumeyer et al. |
| 7,668,341 | B2 | * | 2/2010 | Miyajima et al. ............. 382/104 |
| 2002/0106109 | A1 | * | 8/2002 | Retterath et al. ............. 382/104 |
| 2004/0227647 | A1 |   | 11/2004 | Yanai |

FOREIGN PATENT DOCUMENTS

| JP | 10-177699 | 6/1998 |
| JP | 2006-4173 | 1/2005 |
| JP | 2005-98853 | 4/2005 |
| JP | 2005-347945 | 12/2005 |
| WO | WO 2005/076751 | 8/2005 |

* cited by examiner

OTHER PUBLICATIONS

Notification of Reasons for Refusal for JP 2006-060226 dated Dec. 1, 2009. International Search Report, Dec. 7, 2007.
Written Opinion of the ISR, Sep. 5, 2008.

*Primary Examiner* — Brent Swarthout
(74) *Attorney, Agent, or Firm* — Finnegan, Henderson, Farabow, Garrett & Dunner, LLP

(57) ABSTRACT

An image processing system is provided, which includes: a front monitoring device that obtains an image of a view ahead of a vehicle; a vehicle position detecting device that detects the position and orientation of the vehicle; a map database that stores road maps; a traffic indicator position estimating portion that estimates the position of a traffic indicator (23) based on the shape of a road ahead of the vehicle that has been extracted from the map database, according to the position of the vehicle that has been detected by the vehicle position detecting device; an image processing region setting portion that sets an image processing region within the image obtained by the front monitoring device based on the position of the traffic indicator that has been estimated by the traffic indicator position estimating portion; and a traffic indicator detecting portion that detects the traffic indicator from the image processing region.

9 Claims, 19 Drawing Sheets

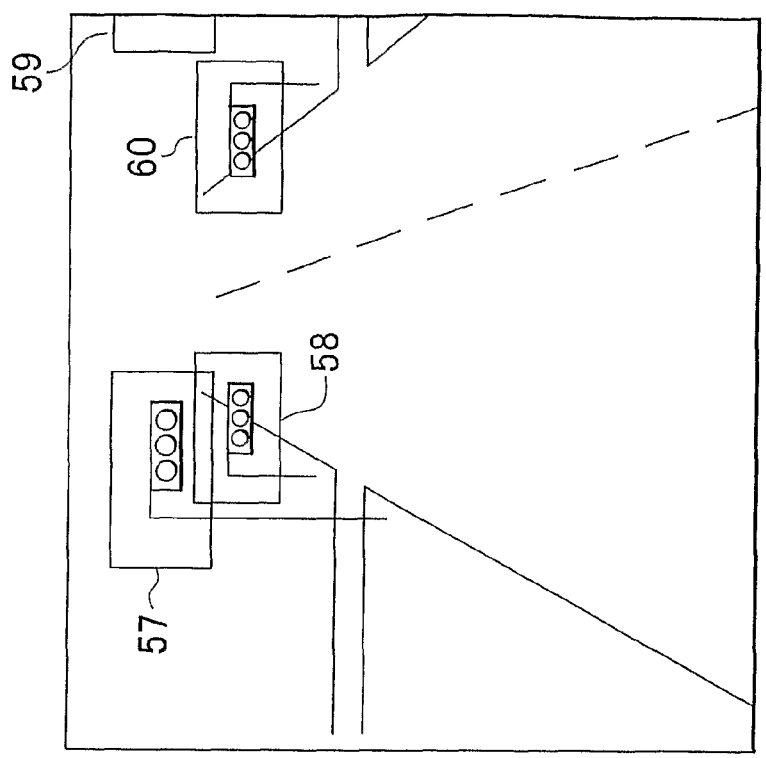
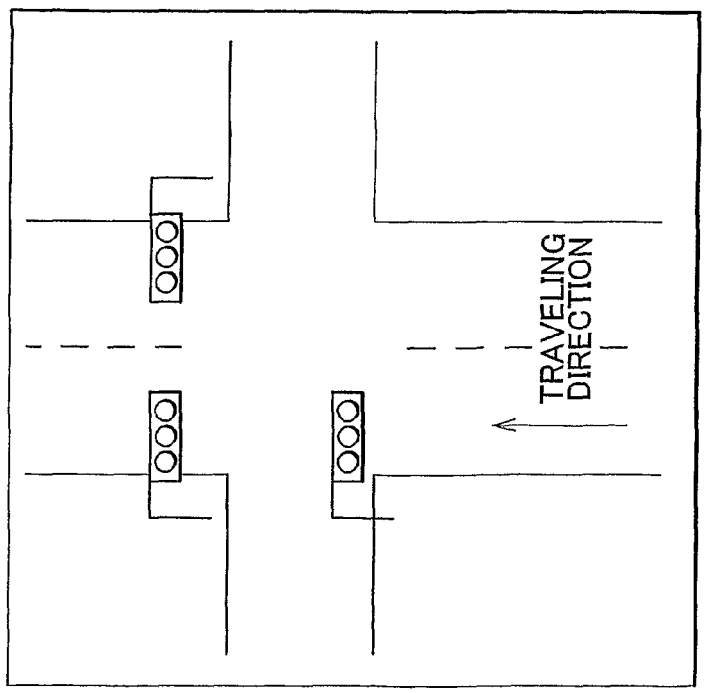

IMAGE PROCESSING SYSTEM AND METHOD

BACKGROUND OF THE INVENTION

1. Field of the Invention

The invention relates to an image processing system and method for detecting a traffic indicator ahead of a vehicle.

2. Description of the Related Art

With improvement of the performance of on-vehicle cameras and evolution of information processing technologies, technologies have been proposed in which a vehicle detects the conditions around the vehicle and encourages the driver to perform an emergency operation to avoid a danger as needed, and performs an automatic vehicle control that, for example, brakes the vehicle (for example, see JP-A-10-177699).

In the technology described in JP-A-10-177699, during route guidance for the driver of a vehicle, a traffic indicator, such as a traffic signal, is detected from the data of images captured in the traveling direction of the vehicle when the vehicle is approaching a diverging point in the directed route, and the route guidance is then performed for the driver using the detected traffic indicator. In this technology, the regions over which the image processing is performed are limited to around diverging points, and thus it is possible to increase the speed of the image processing.

Also, technologies have been proposed in which, when detecting traffic signals, searching of traffic signals is performed over the region above the vertical center of each captured image, assuming that traffic signals are located several meters above the road surface (for example, see JP-A-2005-098853).

However, in JP-A-10-177699 describing the technology that detects a traffic signal, as a traffic indicator, which is located at or near a diverging point, there is no description regarding a method for estimating the position of a traffic signal. Traffic signals are often located at intersections and pedestrian crossings. However, if searching of traffic signals is performed over the entire region of the image captured at a diverging point of the directed route, the load of image processing is still large.

When searching a traffic indicator in an image, if the coordinate of the traffic indicator is known with a certain degree of accuracy, the speed of image data processing increases. For example, the three-dimensional position of a traffic indicator may be determined from an image or based on the position of the vehicle. In this case, the initial position of a traffic indicator is an important parameter. However, if the initial position is fixed at the region several meters above the road surface, the coordinate calculation diverges in some cases.

SUMMARY OF THE INVENTION

The invention provides an image processing system and method that accurately detect a traffic indicator from an image of a view ahead of a vehicle.

One aspect of the invention relates to an image processing system that includes: a front monitoring device that obtains an image of a view ahead of a vehicle; a vehicle position detecting device (e.g., GPS/INS device 2) that detects a position and an orientation of the vehicle, a map database that stores a road map; a traffic indicator position estimating portion (e.g., traffic signal position estimating portion 7) that estimates a position of a traffic indicator based on a shape of a road ahead of the vehicle that has been extracted from the map database, according to the position of the vehicle that has been detected by the vehicle position detecting device; an image processing region setting portion that sets, within an image obtained by the front monitoring device, an image processing region over which a predetermined image processing is performed, based on the position of the traffic indicator that has been estimated by the traffic indicator position estimating portion; and a traffic indicator detecting portion (e.g., traffic signal detecting portion 9) that detects the traffic indicator from the image processing region through the predetermined image processing.

Another aspect of the invention relates to an image processing method including: obtaining an image of a view ahead of a vehicle; detecting a position and an orientation of the vehicle; extracting a shape of a road ahead of the vehicle from a road map database that pre-stores a road map, based on the detected position of the vehicle; estimating a position of a traffic indicator based on the shape of the road; setting an image processing region over which a predetermined image processing is performed, based on the estimated position of the traffic indicator, and detecting the traffic indicator from the image processing region through the predetermined image processing.

According to the image processing system and method described above, it is possible to accurately detect a traffic indicator from an image of a view ahead of the vehicle.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 7A is a view showing one example of the shape of a road that is extracted from the road map database;

FIG. 7B is a view showing one example of a captured image;

DETAILED DESCRIPTION OF THE PREFERRED EMBODIMENTS

Hereinafter, exemplary embodiments of the invention will be descried with reference to the accompanying drawings. Note that, while a traffic signal is described as one example of a traffic indicator in the following descriptions, any other traffic indicators, such as traffic signs, may be used alternatively.

First Exemplary Embodiment

Figure 1:
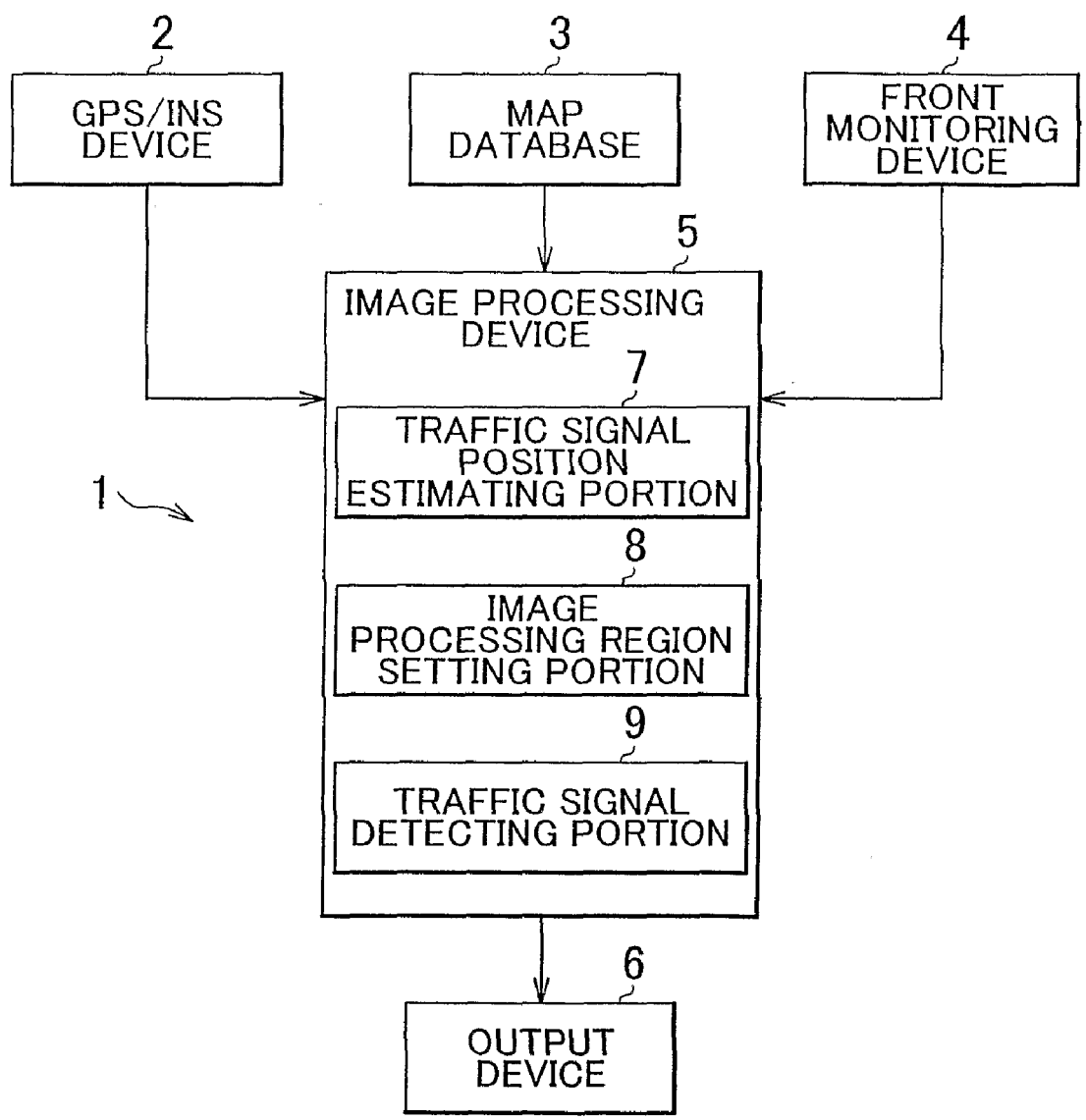
FIG. 1 is a view showing one example of the configuration of an image processing system according to the first exemplary embodiment.

FIG. 1 illustrates an example of the overall configuration of an image processing system according to the first exemplary embodiment. The image processing system includes a GPS (Global Positioning System)/INS (Inertial Navigation System) device 2, a map database 3, a front monitoring device 4, an image processing device 5, and an output device 6. The image processing device 5 includes a traffic signal position estimating portion 7, an image processing region setting portion 8, and a traffic signal detecting portion 9.

The GPS/INS device 2 receives navigation messages from GPS satellites and determines the coordinate of the vehicle based on the received messages, and the GPS/INS device 2 accurately estimates the position of the vehicle using an autonomous navigation method.

More specifically, the GPS/INS device 2 determines the position of the vehicle using electric waves that the GPS/INS device 2 receives from the GPS satellites. That is, the distance between the vehicle and each GPS satellite can be calculated by multiplying the time of propagation of electric wave transmitted from the GPS satellite with the velocity of light. Thus, when determining the position of the vehicle, the distances to more than three GPS satellites are first calculated, and the intersecting point of the spheres having radiuses equal to the calculated distances to the respective GPS satellites is determined as the coordinate of the vehicle. Note that, by using the navigation data from the fourth GPS satellite, the clock of the vehicle can be corrected and thus the coordinate of the vehicle can be determined more accurately.

Then, based on the determined coordinate of the vehicle, the GPS/INS device 2 accurately estimates the position of the vehicle using an autonomous navigation method as follows. A vehicle speed sensor that detects the speed of the vehicle and a gyro sensor that detects the traveling direction of the vehicle are connected to the GPS/INS device 2. The GPS/INS device 2 continuously accumulates the data of the trajectories of the vehicle that are defined by the detected vehicle speed and the detected traveling direction of the vehicle, and the GPS/INS device 2 estimates the position of the vehicle using an autonomous navigation method based on the accumulated trajectory data. Note that the information regarding the orientation of the vehicle, which is detected by the gyro sensor, is provided to the image processing device 5 and used for image data processing.

Finally, the GPS/INS device 2 accurately determines the present position of the vehicle using a map-matching method. That is, the present position of the vehicle is determined by matching the vehicle position, based on the vehicle coordinate obtained from the navigation messages, estimated by the autonomous navigation method to the roads and vehicle position indicated on a road map extracted from the map database 3.

The map database 3 is a database that stores road map information, and the map database 3 is provided in the form of a hard disk drive, a CD-ROM drive, a DVD-ROM drive, or the like. The road map information contains information regarding road networks and intersections that are defined by the latitude and longitude. More specifically, the map database 3 is a database provided in the form of data tables containing the information regarding nodes (crossing points of roads, that is, intersections) and links (roads via which nodes are connected), which correspond to the intersections and roads in the actual road networks.

Among the above data tables, each node table contains the identification codes and coordinates of nodes, and the number and identification codes of the links extending from the nodes, and each link table includes the identification codes of links, the identification codes of the nodes as the starting and ending points of the links, and the lengths of the links. Unique identification codes are assigned to the nodes and links, and therefore the road networks are defined by tracking the identification codes of the nodes and links.

The map database 3 also stores the information regarding the length and width of each road and the number of lanes of each road. Furthermore, the map database 3 stores the information regarding the road types (e.g., highways, national roads, local roads), buildings (e.g., department stores, land bridges), and traffic regulations (e.g., regulation speeds, one-way streets, no U-turns).

Next, the front monitoring device 4 will be described. The front monitoring device 4 is formed by a camera, radar, or the like, and detects the conditions ahead of the vehicle.

In the case that the front monitoring device 4 is a camera including photoelectric conversion elements, such as CCDs and MOSs, the light from the front of the vehicle is converted into electricity using the photo diodes and the accumulated electric charges are read out as voltages and then amplified. The amplified voltages are converted to digital signals (A/D conversion), and the digital signals are then converted into a digital image having certain brightness levels (e.g., 256 levels). For example, the camera captures images at the frame rate of 30 to 60 fps, and continuously outputs the data of the captured images to the image processing device 5 while temporarily storing the data in a predetermined buffer.

Even when only one camera is used, it is possible to determine the distance to a subject by image processing. On the other hand, when a stereo camera is used, the parallax between the two cameras is determined by analyzing the data of two images captured at the same time. After the parallax is thus determined, the distance at each pixel can be determined by triangulation based on the parallax, the focal lengths of the cameras, and the distance between the cameras. In the first exemplary embodiment, the data of image captured by a single camera is used in view of the load of image processing.

Figure 2:
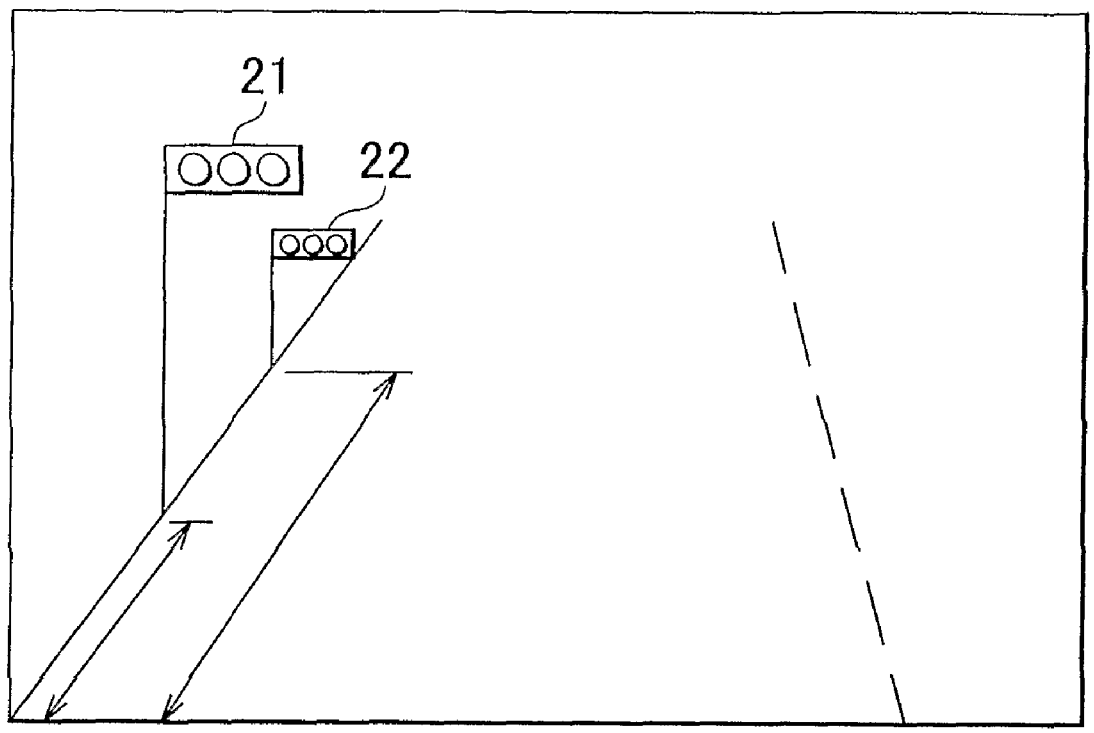
FIG. 2 is one example of an image captured by the camera.

FIG. 2 is one example of an image captured by the camera. The image in FIG. 2 shows traffic signals 21, 22. Since the position and orientation of the vehicle have already been determined by the GPS/INS device 2, if the position of each traffic signal 21, 22 is estimated, the region of the image in which the traffic signals 21, 22 are present can be estimated with a certain degree of accuracy.

Meanwhile, in the case where the front monitoring device 4 is a radar, the shape of an object ahead of the vehicle and the distance to that object can be determined by measuring the time from when radar pulses are transmitted from the radar to when the radar pulses return to the radar. The radar device supplies pulse current to a laser diode and starts time count at the same time. When supplied with the pulse current, the laser diode outputs laser pulses, which are proportional to the current, in the forward direction. When the receiving portion of the radar receives the laser pulses reflected from the object ahead of the vehicle, the radar stops the time count. Because the counted time is proportional to the distance to the object, the distance to the object can be determined by multiplying the counted time with an appropriate coefficient.

The radar continuously transmits laser pulses while changing the transmission direction such that a predetermined region ahead of the vehicle is scanned. Thus, by repeating the operation described in the previous paragraph, the distance to the object can be determined at each scanning point. This distance information is stored in a processing unit, such as a microcomputer, and the processing unit generates image data based on the scanning directions, the distances to the object, and the orientation of the vehicle.

The above is how the radar-based front monitoring device 4 obtains images such as shown in FIG. 2. Note that it is difficult to distinguish different colors (such as, the signal colors of a traffic signal) in images using a radar.

The traffic signal position estimating portion 7 of the image processing device 5 estimates the position of a traffic signal at an intersection based on the shape of the intersection. Because the present position of the vehicle is determined by the GPS/INS device 2 as described above, the map of the region around the vehicle, in particular, the map of roads in the traveling direction of the vehicle can be obtained from the map database 3, and therefore the shape of the road ahead of the vehicle can be determined. There are many traffic signals along each road, however, they are usually provided at specific positions. In the following, detailed description will be made of how the position of each traffic signal is estimated based on the presence or absence of an intersection, the shape of a road, etc.

The image processing region setting portion 8 of the image processing device 5 sets a region of an image over which searching of traffic signals is performed, based on the positions of the traffic signals estimated by the traffic signal position estimating portion 7 and the position and orientation of the vehicle.

Figure 3B:
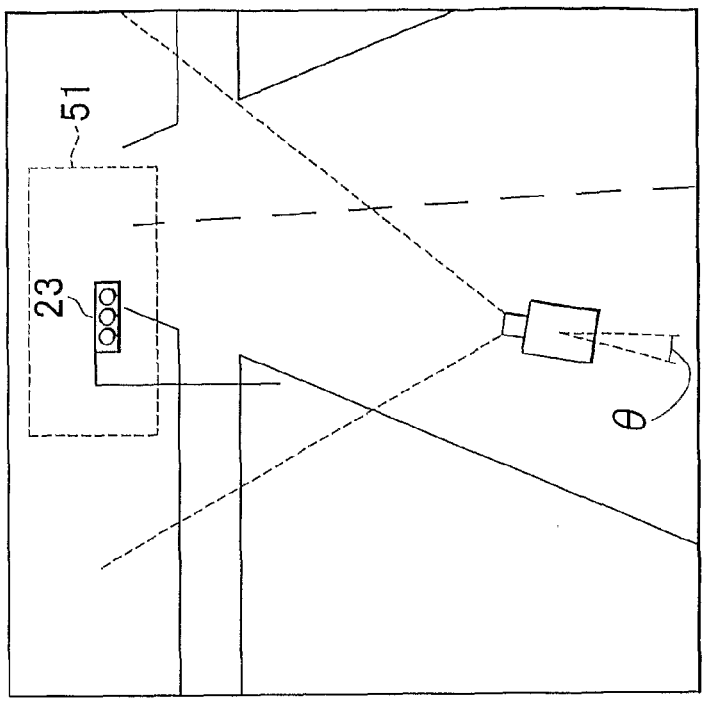
FIG. 3B is a view showing one example of a captured image.
Figure 3A:
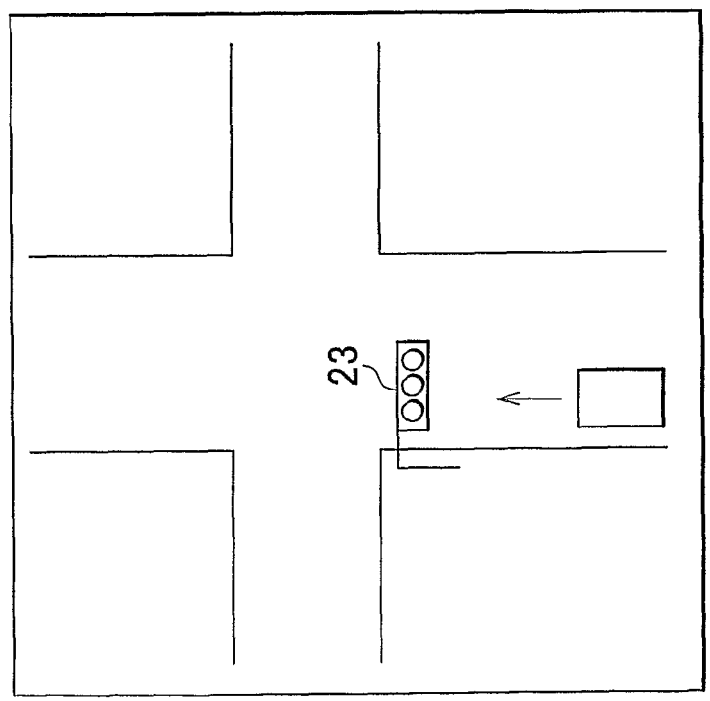
FIG. 3A is a view showing one example of the shape of a road that is extracted from the road map database.

FIG. 3A shows the shape of a road and the present position of the vehicle, which have been extracted from the map database 3. FIG. 3B shows an image captured when the position of the vehicle is detected as shown in FIG. 3A.

According to the shape of the road shown in FIG. 3A, the traffic signal position estimating portion 7 detects an intersection ahead of the vehicle and estimates the distance to the intersection. For example, when an intersection is detected, the traffic signal position estimating portion 7 assumes that a traffic signal is present at a corner before the intersection, and estimates the distance to the traffic signal based on the road map. The traffic signal is located several meters above the road surface.

Because the image processing region setting portion 8 has already obtained the orientation of the vehicle (the angle θ of the camera with respect to the traffic signal in FIG. 3B), the image processing region setting portion 8 can determine the direction in which an image such as shown in FIG. 3B has been captured with respect to the intersection. That is, once the position of the traffic signal has been estimated, it is possible to identify the region of the image in which the traffic signal is likely to be present, based on the position and orientation of the vehicle. Note that the size of a search frame may be changed in accordance with the distance between the vehicle and the traffic signal.

Indicated by an oblong square in FIG. 3B is a search frame 51 that is a region in which a traffic signal is estimated to be present by the image processing region setting portion 8. Thus, the traffic signal detecting portion 9 of the image processing device 5 is only required to perform searching of the traffic signal over the region identified by the search frame 51.

The traffic signal detecting portion 9 searches the traffic signal by processing the data of image. For example, the traffic signal detecting portion 9 searches the traffic signal by template matching. More specifically, in template marching, an image of a standard traffic signal, which is a template, is overlaid on the image and continuously displaced pixel by pixel so as to scan the entire region of the search frame 51 or the entire region of the image. During the scanning, for example, the traffic signal detecting portion 9 calculates the degree of matching between the brightness distribution of the template image and that of each scanned portion of the image, and determines the position of the temperate at which the degree of matching is highest as the position of the traffic signal. Regarding distinction of red, blue, and yellow, the position with the highest brightness among the three circles of the traffic signal is determined as being turned on. Note that machine learning, such as support vector machine or neutral network, may be used for the image processing for detecting traffic signals. When detecting traffic signals, learning databases each containing a template of a traffic signal having a different size may be used. In this case, the learning databases are selectively used based on the distance to the traffic signal, and therefore the accuracy of detection improves.

The output device 6 is a liquid crystal display, an organic electroluminescent display, a head-up display, or the like, which displays road maps, traffic information, and a route to a destination. A speaker is connected to the output device 6. The speaker 6 generates a sound notifying the position of a traffic signal and a cautionary sound.

Next, more detailed description will be made of how the image processing region setting portion 8 sets a search frame. Two or more of the following methods may be used in combination provided that no conflict occurs between them. When using two or more methods that conflict each other, it is recommended that one of the methods be used in advance, and if no traffic signal is detected by that method, the next method then be used.

i) When a Traffic Signal is Estimated to be Above a Road

Figure 4B:
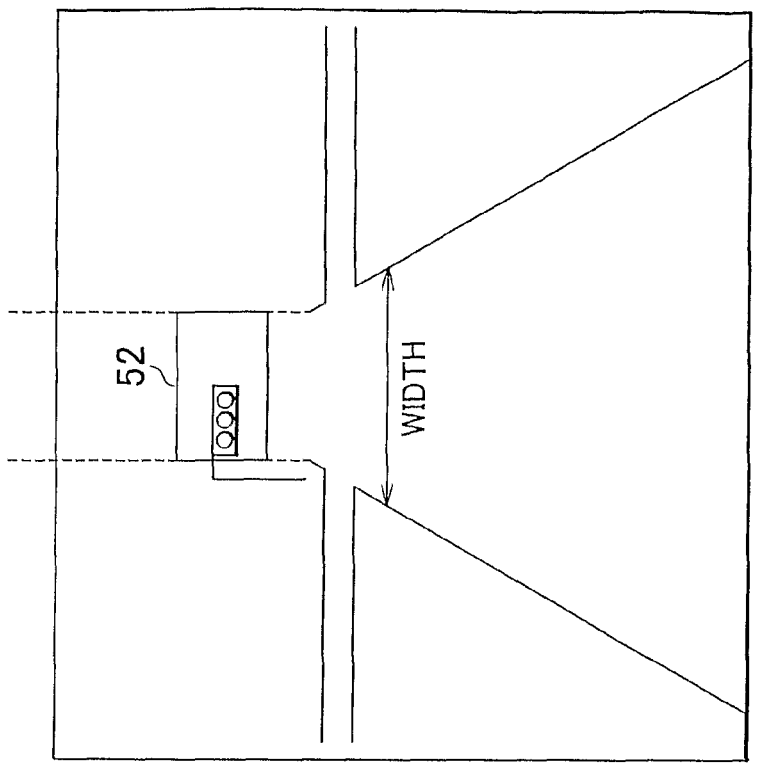
FIG. 4B is a view showing one example of a captured image.
Figure 4A:
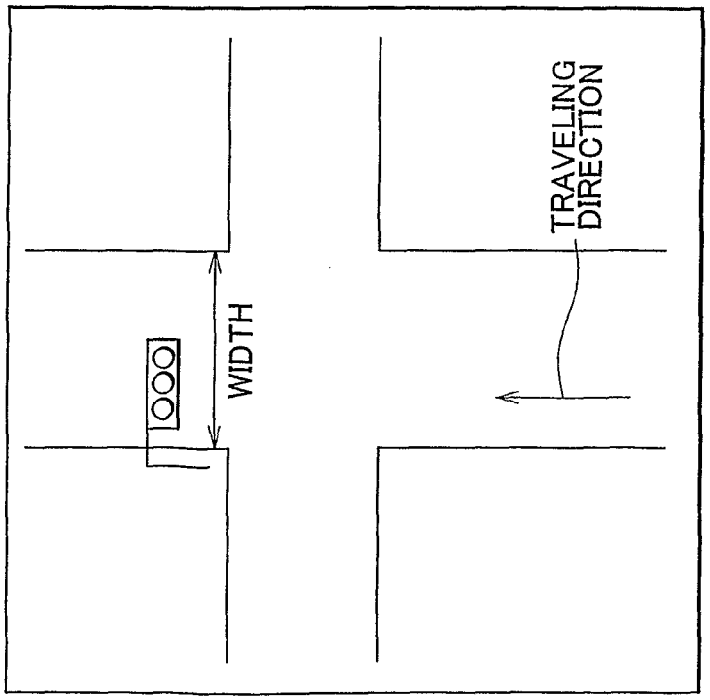
FIG. 4A is a view showing one example of the shape of a road that is extracted from the road map database.

FIG. 4A shows the shape of a road ahead of the vehicle, which has been extracted from the map database 3, and FIG. 4B shows an image captured when the position of the vehicle is detected as shown in FIG. 4A.

According to this method in which a traffic signal is estimated to be above a road, the image processing region setting portion 8 sets the width of the search frame to be substantially equal to the width of the road. The information regarding the width of the road is stored in the map database 3. In the case that the width of the road is not recorded in the map database 3, the image processing region setting portion 8 identifies the width of the road on the image by processing the image data.

When guardrails are provided and white lines are drawn along the right and left sides of the road, the captured image shows portions each having a certain level of brightness and extending in the substantially vertical direction of the image, and the region between these portions can be determined as indicating the width of the road. When curbs each painted to indicate no parking zone or no waiting zone are provided along the sides of the road, the width of the road can be determined as in the case of guardrails and white lines. In the case that a radar is used to monitor the conditions ahead of the vehicle, the shape of each guardrail or curb is detected by the radar, and therefore the width of the road can be determined in the same manner as described above.

Figure 5B:
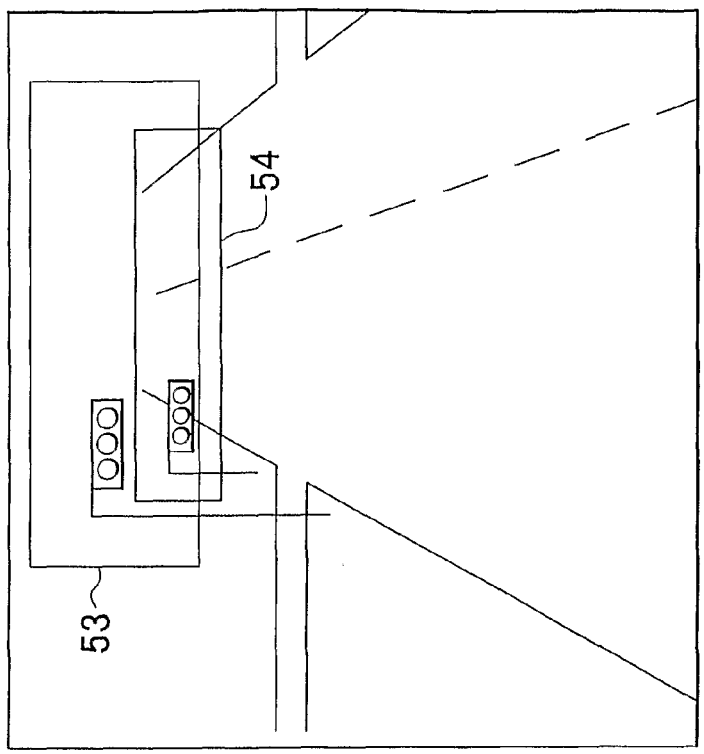
FIG. 5B is a view showing one example of a captured image.
Figure 5A:
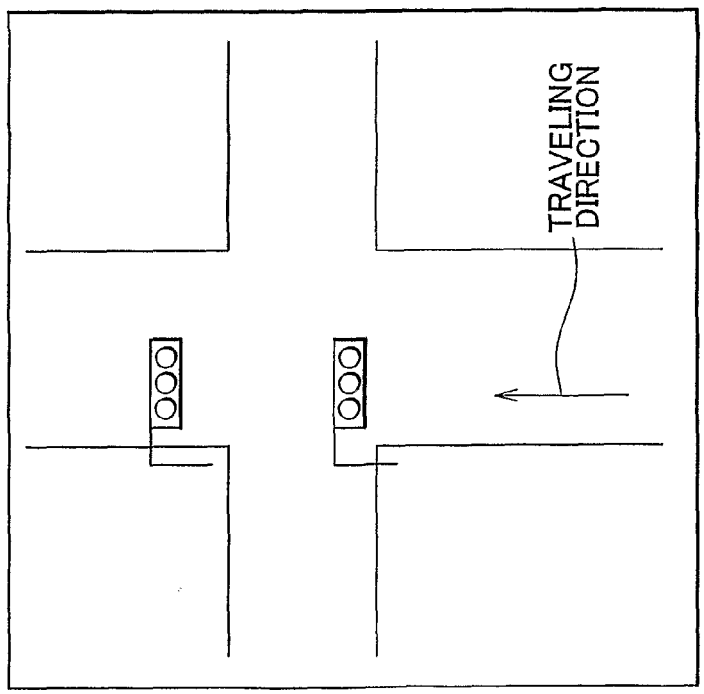
FIG. 5A is a view showing one example of the shape of a road that is extracted from the road map database.

After determining the width of the road, the image processing region setting portion 8 then sets a search frame 52 having a width substantially equal to the width of the road, based on the position of the vehicle obtained from the GPS/INS device 2, the distance to the intersection, and the orientation of the vehicle. As such, in the method described above, the search region can be made smaller than it is when searching of the traffic signal is performed over the entire region of the image.

ii) When Traffic Signals are Estimated to Present be Before or after an Intersection, Respectively FIG. 5A shows the shape of a road ahead of the vehicle, which has been extracted from the map database 3, and FIG. 5B shows an image captured when the position of the vehicle is detected as shown in FIG. 5A.

According to this method, the traffic signal position estimating portion 7 estimates traffic signals to be located before and after an intersection, respectively. The image processing region setting portion 8 sets a search frame 53 for the traffic signal located before the intersection and a search frame 54 for the traffic signal located after the intersection, based on the position of the vehicle, the distance to a predetermined point before the intersection, the distance to a predetermined point after the intersection, and the orientation of the vehicle, which are obtained from the GPS/INS device 2.

As such, in the method described above, the search region can be made smaller than it is when searching of the traffic signals is performed over the entire region of the image.

Figure 6A:
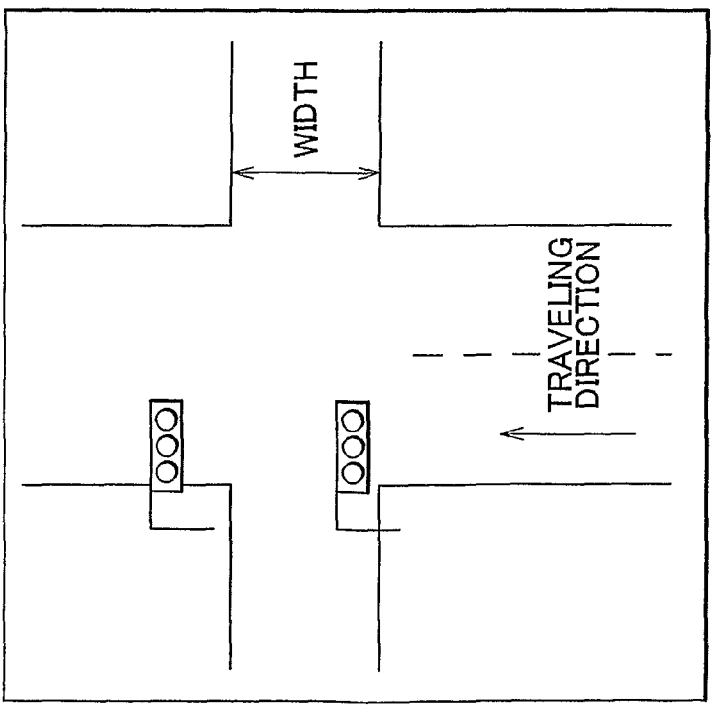
FIG. 6A is a view showing one example of the shape of a road that is extracted from the road map database.
Figure 6B:
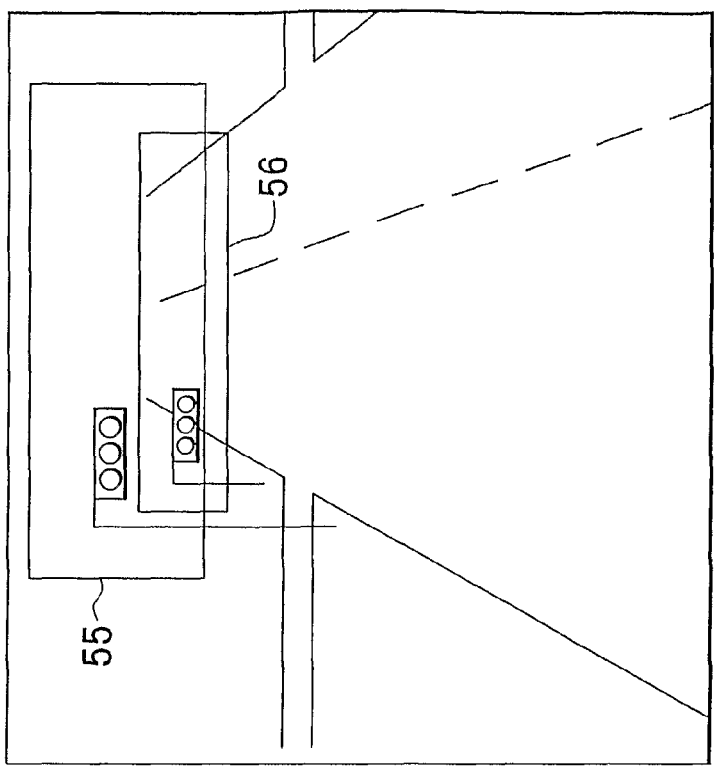
FIG. 6B is a view showing one example of a captured image.

Note that the width of each search frame 53, 54 may be set substantially equal to the width of the road, or may be set slightly greater than the width of the road for some margin. Also, the size of the image processing region can be reduced by making the size of the frame 54, which is set for the traffic signal located after the intersection; smaller than the search frame 53, which is set for the traffic signal located before the intersection, according to the difference in the distance from the vehicle.

iii) When Traffic Signals are Estimated to be Located Before and after a Crossing Road Across the Crossing Road FIG. 6A shows the shape of a road ahead of the vehicle, which has been extracted from the map database 3, and FIG. 6B shows an image captured when the position of the vehicle is detected as shown in FIG. 6A.

According to this method, the traffic signal position estimating portion 7 estimates a traffic signal to be located before an intersection and another traffic signal to be located behind the foregoing traffic signal by the distance substantially equal to the width of a crossing road. The image processing region setting portion 8 sets a search frame 55 for the traffic signal located before the intersection and a search frame 56 for the second traffic signal located after the intersection, based on the position of the vehicle, the distance to the intersection, and the orientation of the vehicle, which are obtained from the GPS/INS device 2, and based on the width of the crossing road, which is extracted from the map database 3.

As such, in the method described above, the search region can be made smaller than it is when searching of the traffic signals is performed over the entire region of the image.

Note that the width of each search frame 55, 56 may be set substantially equal to the width of the road, or may be set slightly greater than the width of the road for some margin. Also, the size of the image processing region can be further reduced by making the size of the search frame 56, which is set for the traffic signal located after the intersection, smaller than the size of the search frame 55, which is set for the traffic signal located before the intersection, according to the difference in the distance from the vehicle.

iv) When the Vehicle is Traveling on a Wide Road and Traffic Signals are Estimated to be Located at the Corners of an Intersection FIG. 7A shows the shape of a road ahead of the vehicle, which has been extracted from the map database 3, and FIG. 7B shows an image captured when the position of the vehicle is detected as shown in FIG. 7A.

A "wide road" is a road having at least a certain number of lanes or having at least a certain width. In the case of an intersection of such a wide road, traffic signals are sometimes provided at the corners of the intersection so that drivers can easily find each traffic signal.

According to this method, the traffic signal position estimating portion 7 estimates a traffic signal to be located at each corner of the intersection. Thus, in the case of the road shape shown in FIG. 7A, four search frames are set for the four corners of the intersection, respectively.

Specifically, the image processing region setting portion 8 sets search frames 57 to 60 for the respective corners in the image, based on the position of the vehicle, the distance to each corner, and the orientation of the vehicle, which are obtained from the GPS/INS device 2.

Note that the width of each search frame may be set to be substantially half the width of the road, or to be slightly greater than the half width for some margin. Also, the size of the image processing region can be further reduced by making the size of the search frames 58, 60, which are located before the intersection, smaller than the search frames 57, 59, which are located after the intersection, according to the difference in the distance from the vehicle.

Thus, when the width of the road is large, by limiting the position of a traffic signal to each corner of the intersection, the search region can be made smaller than it is when searching of the traffic signals is performed over the entire region of the image or across the entire width of the road.

v) When the Vehicle is Traveling on a Curve

Figure 8B:
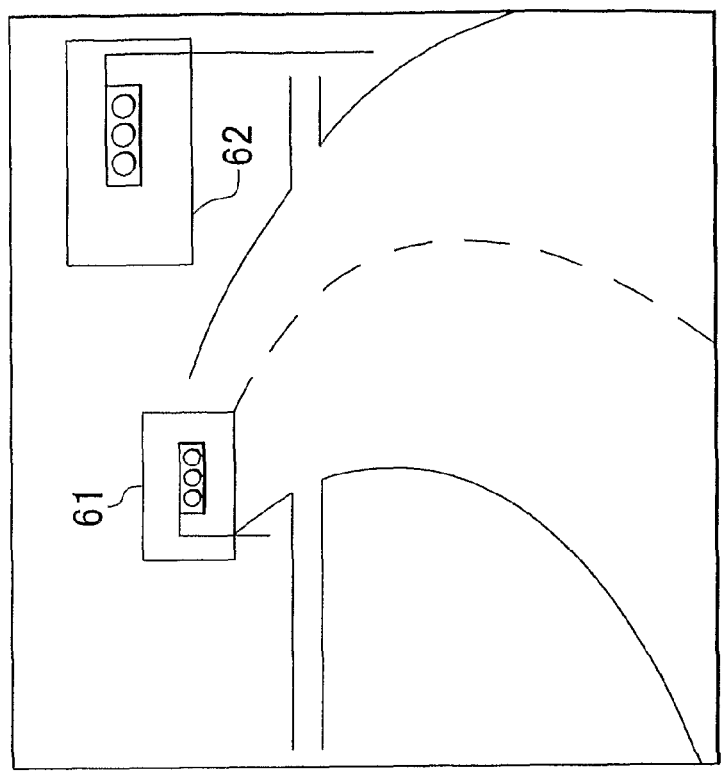
FIG. 8B is a view showing one example of a captured image.
Figure 8A:
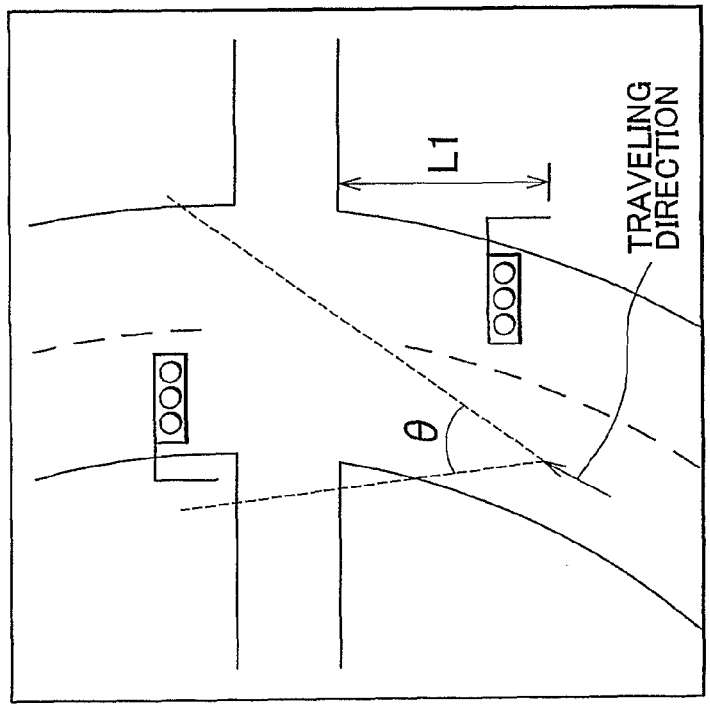
FIG. 8A is a view showing one example of the shape of a road that is extracted from the road map database.

FIG. 8A shows the shape of a road ahead of the vehicle, which has been extracted from the map database 3, and FIG. 8B shows an image captured when the position of the vehicle is detected as shown in FIG. 8A.

When the vehicle is traveling on a curve, the traveling direction of the vehicle and the position of a traffic signal do not match, and therefore a search frame is set in accordance with the curvature of the road. When the road to the intersection bends as shown in FIG. 8A, the position of a traffic signal for the intersection is offset frontward from the intersection by a predetermined distance so that drivers can find the traffic signal beforehand. In general, the offset distance L1 (offset) is obtained as a function of a curvature K of the curve, and calculated as below:

$$L1(\text{offset}) = C1 \times K \qquad (1)$$

In the above equitation, C1 is a given constant. The traffic signal position estimating portion 7 thus calculates the offset distance L1 (offset) and estimates the position of the traffic signal.

Then, the image processing region setting portion 8 sets the position of a search frame 61 based on the position of the vehicle, the angle θ between the intersection and the orientation of the vehicle, and the distance to the intersection, which are obtained from the GPS/INS device 2.

Also, the image processing region setting portion 8 sets the position of a search frame 62 based on the offset distance L1 (offset), and based on the position of the vehicle, and the distance to the intersection, which are obtained from the GPS/INS device 2.

Note that the width of each search frame 61, 62 may be set to be substantially equal to the width of the road, substantially half the width of the road, substantially equal to the width of one lane of the road, or slightly greater than each of them for some margin. Also, the size of the image processing region can be further reduced by adjusting the size of each search frame 61, 62 in accordance with the difference in the distance from the vehicle.

In the method described above, even if the road is a curve, by limiting the position of each traffic signal in accordance with the curvature of the road, the search region can be made smaller than it is when searching of the traffic signals is performed over the entire region of the image.

vi) When the Vehicle is Traveling on a Slope

Figure 9A:
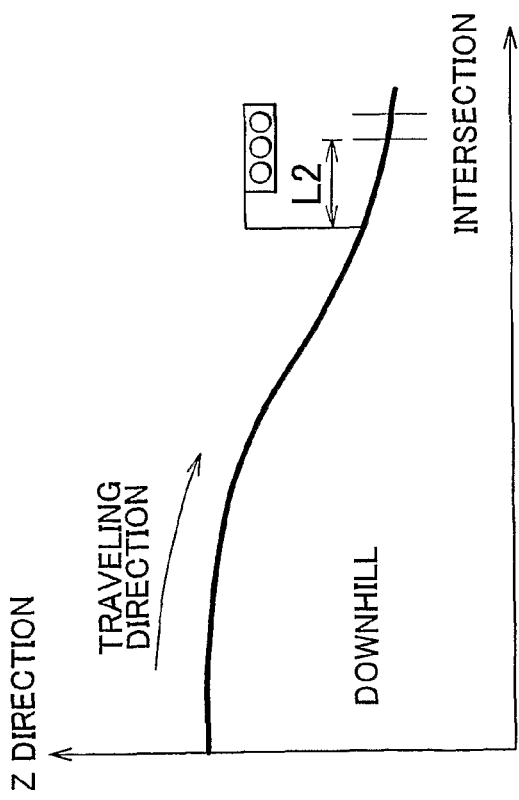
FIG. 9A is a view showing one example of the shape of a road that is extracted from the road map database.
Figure 9B:
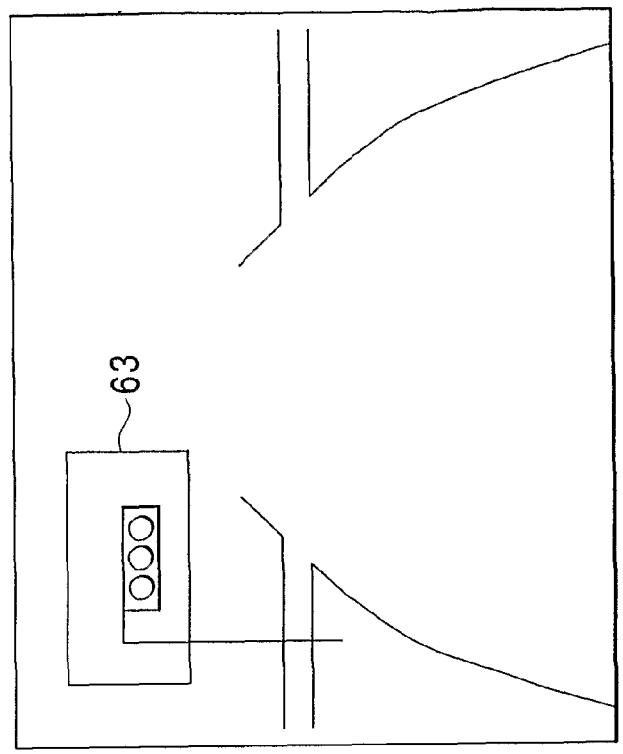
FIG. 9B is a view showing one example of a captured image.

FIG. 9A shows the inclination of the road, which is extracted from the map database 3, and FIG. 9B shows an image captured when the position of the vehicle is detected as shown in FIG. 9A.

In the case of an intersection of an inclined road, a traffic signal is located a predetermined offset distance before the intersection so that drivers can easily find the traffic signal. The offset distance L2 (offset) is obtained as a function of an inclination α and calculated as below:

$$L2(\text{offset}) = C2 \times \alpha \qquad (2)$$

In the above equation, C2 is a given constant. Thus, the traffic signal position estimating portion 7 calculates the offset distance L2 based on the inclination α of the road, and the image processing region setting portion 8 sets the position of a search frame 63 based on the position of the vehicle and the distance to the intersection, which are obtained from the GPS/INS device 2. Note that, even when the vehicle is traveling on an inclined road, the vehicle and the road surface remain parallel to each other, and therefore the position of the vehicle relative to the position of the traffic signal, which is provided several meters above the road surface, is not so different from when the vehicle is traveling on a flat road.

Note that the width of the search frame 63 may be set to be substantially equal to the width of the road, substantially half the width of the road, substantially equal to the width of one lane of the road, or slightly greater than each of them for some margin, depending upon the width of the road.

Accordingly, when the vehicle is traveling on an inclined road, by limiting the position of a traffic signal in accordance with the inclination of the road, the search region can be made smaller than it is when searching of the traffic signal is performed over the entire region of the image.

vii) When the Vehicle is Traveling on a Narrow Road

Figure 10B:
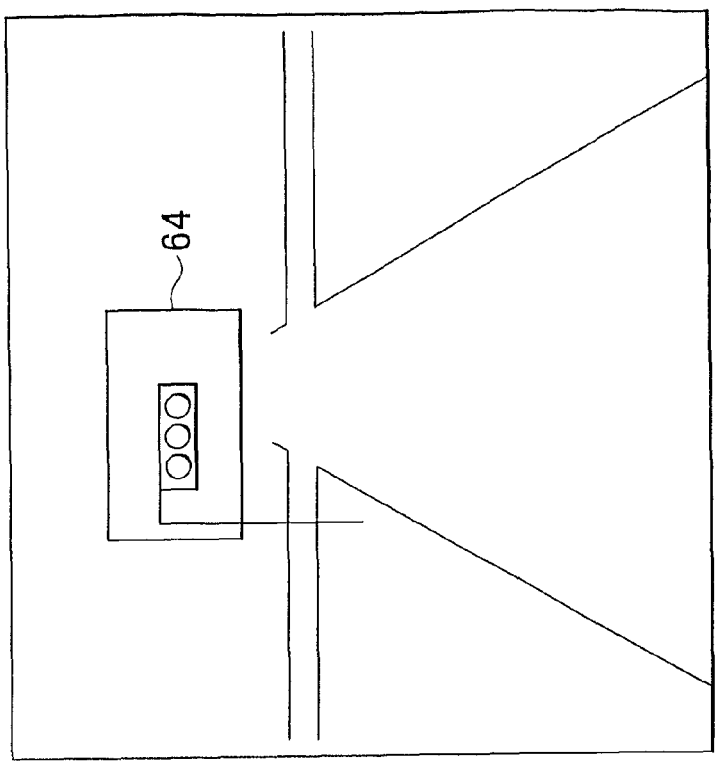
FIG. 10B is a view showing one example of a captured image.
Figure 10A:
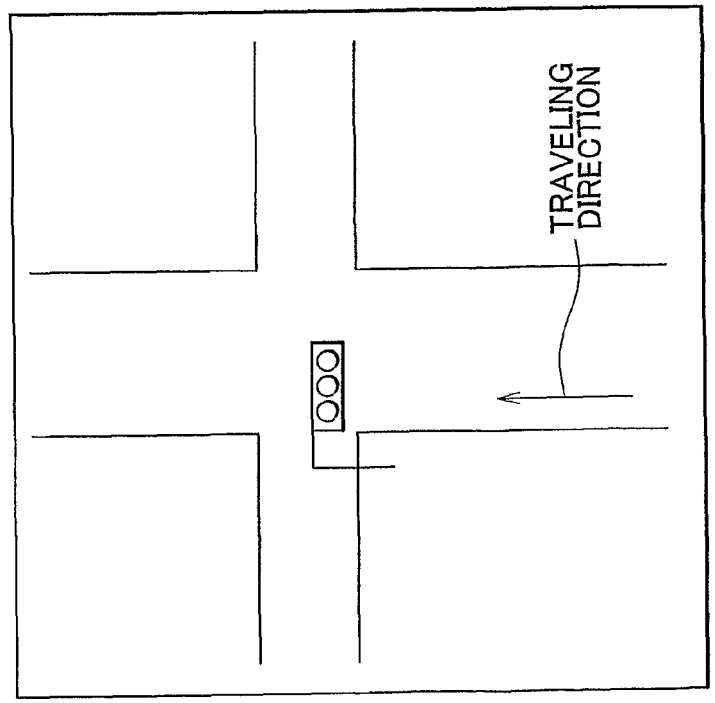
FIG. 10A is a view showing one example of the shape of a road that is extracted from the road map database.

FIG. 10A shows the shape of a road ahead of the vehicle, which has been extracted from the map database 3, and FIG. 10B shows an image captured when the position of the vehicle is detected as shown in FIG. 10A.

In the case of an intersection of a narrow road, a traffic signal is sometimes located at the center of the intersection. Here, "the center of the intersection" corresponds to the lateral center of the road or the vicinity thereof. The information regarding the width of the road on which the vehicle is traveling is stored in the map database 3.

The image processing region setting portion 8 sets a search frame 64 in the image based on the position of the vehicle, the distance to the intersection, and the orientation of the vehicle, which are obtained from the GPS/INS device 2, and based on the width of each of the two roads, which are extracted from the map database 3.

As such, in the method described above, the search region can be made smaller than it is when searching of the traffic signal is performed over the entire region of the image.

Note that the width of the search frame 64 may be set substantially equal to the width of the road, or may be set slightly greater than it for some margin.

As described above, the image processing system 1 according to the exemplary embodiment, when the vehicle is approaching an intersection, estimates the position of each traffic signal and sets search frames in accordance with the width of the road, the shape of the road, etc.

Figure 11:
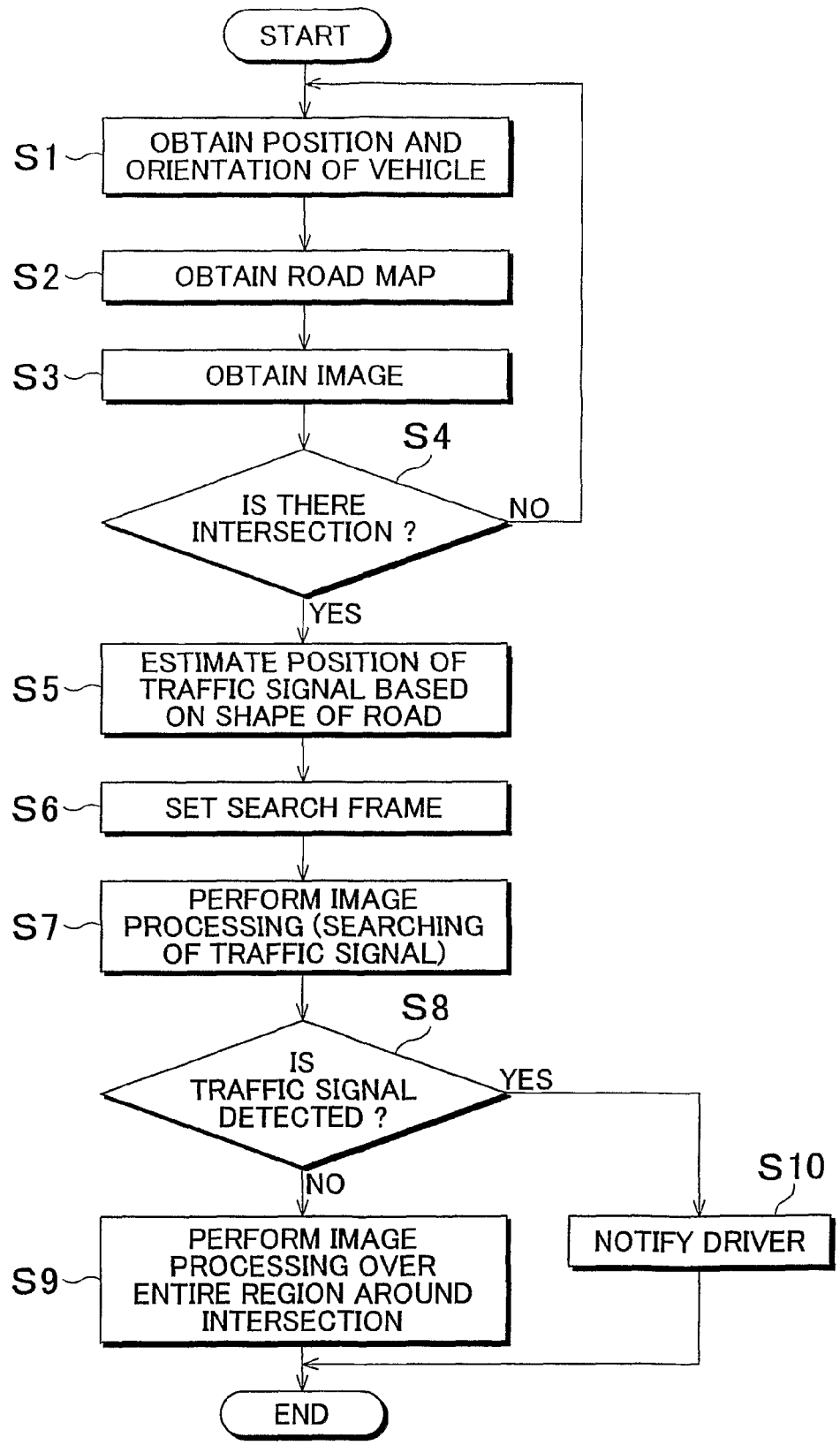
FIG. 11 is a flowchart indicating a control routine executed by the image processing system to detect traffic signals.

FIG. 11 is a flowchart indicating a control routine executed by the image processing system to detect traffic signals. The control routine starts in response to the ignition being turned on or to the vehicle starting moving.

When the vehicle is traveling, the GPS/INS device 2 obtains the position and orientation of the vehicle (S1). The image processing device 5 then obtains the road maps around the present position of the vehicle, especially the roads maps of the regions in the traveling direction of the vehicle (S2).

The front monitoring device 4 obtains images at a predetermined frame rate and output the images to the image processing device 5 (S3).

Next, the traffic signal position estimating portion 7 estimates the position of a traffic signal based on the shape of the road extracted from the road map. That is, the traffic signal position estimating portion 7 determines whether there is an intersection (S4), and if there is an intersection (S4: YES), the traffic signal position estimating portion 7 estimates the position of the traffic signal based on the width of the road, the width of the crossing road, the curvature of the road, the inclination of the road, and so on (S5).

After the position of the traffic signal is thus estimated, the image processing region setting portion 8 sets, in the image, a search frame that covers the region in which a traffic signal is estimated to be present (S6). When there are two or more estimated positions of the traffic signal, two or more search frames may be set based on the priorities assigned to the respective estimated positions.

The traffic signal detecting portion 9 searches the traffic signal in the search frame by template matching, or the like (S7).

If no traffic signal is detected (S8: NO), the traffic signal detecting portion 9 searches the traffic signal by performing image processing to the entire image, that is, to the entire region around the intersection (S9).

On the other hand, if the traffic signal is detected in step 7 (S8: YES), a predetermined control is performed, such as detecting the vehicle speed and notifying the driver if the detected vehicle speed is higher than a predetermined level (S10).

Result of detection of traffic signals in the first exemplary embodiment Hereinafter, description will be made of the result of the process that is performed by the image processing system 1 of the first exemplary embodiment to detect traffic signals when the vehicle is traveling at 60 km/h.

Figure 16B:
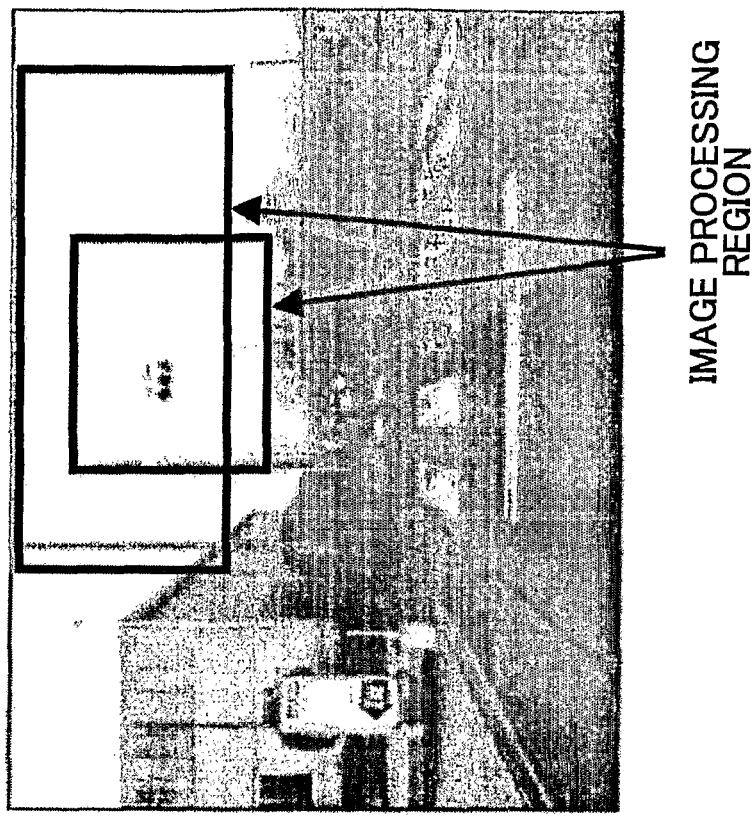
FIGS. 16A and 16B are images captured when the vehicle is traveling on a two-lane road.
Figure 16A:
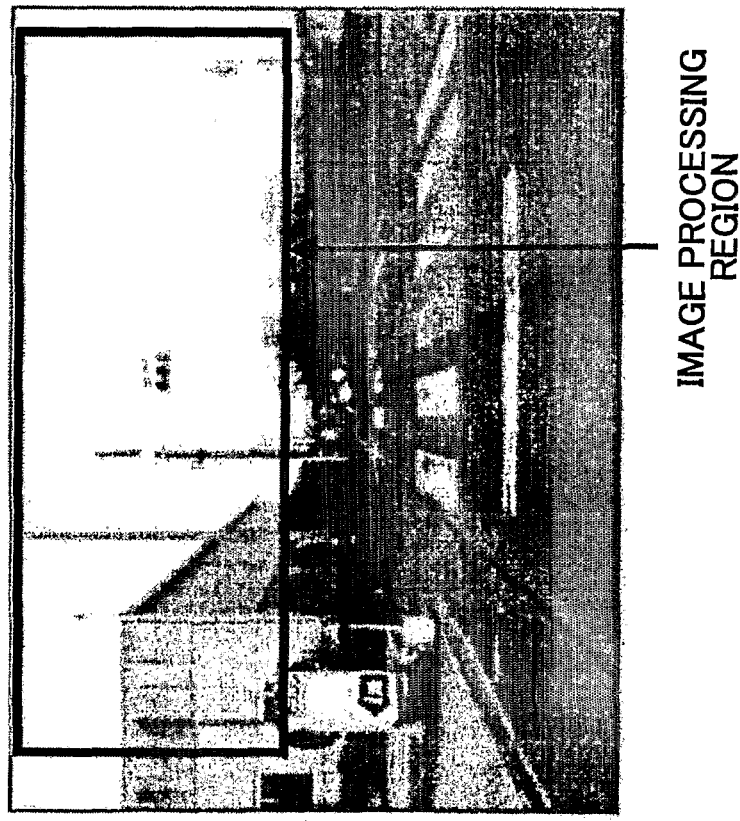

FIGS. 16A and 16B are images captured from the vehicle when the vehicle is traveling on a two-lane road. The region indicated by the frame in FIG. 16A is the search region set when image processing is performed over the entire region around the intersection, as in the conventional methods.

Shown in FIG. 16B are search frames set based on the presumption that traffic signals are located above a road (i) and located before and after the intersection, respectively (ii) or (iii).

Figure 12:
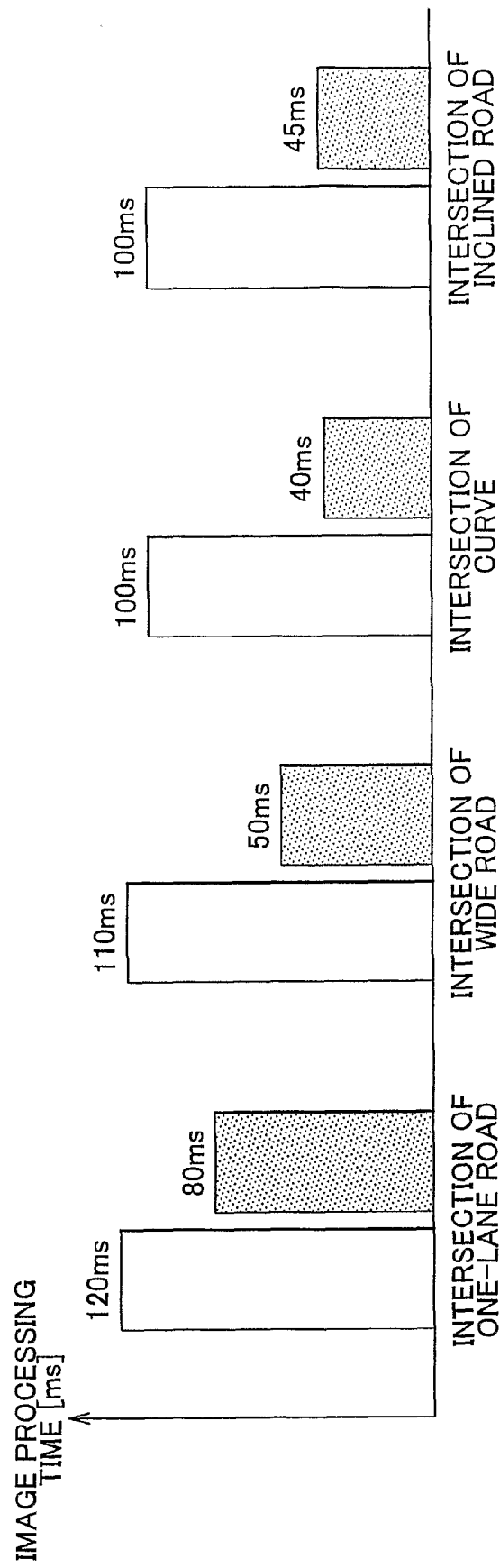
FIG. 12A to FIG. 12D are graphs for comparing the time used for image processing between the case in which a conventional image processing method is used and the case in which the position of a traffic signal is estimated and a search frame is set based on the estimated position of the traffic signal.

FIG. 12 is a graph for comparing the time used for image processing between the case in which a conventional image processing method is used and the case in which the position of a traffic signal is estimated and a search frame is set based on the estimated position of the traffic signal. In FIG. 12, each of the white bars represents the time used when the entire region around the intersection is searched, while each of the black bars represents the time used when a search frame is set and searching of traffic signals is performed within the search frame.

Referring to FIG. 12A, when image processing is performed to the image shown in FIG. 16A and FIG. 16B, it takes 120 msec before detecting a traffic signal when searching of the traffic signal is performed over the entire region around the intersection, and 80 msec when the searching is performed using a search frame.

Figure 17A:
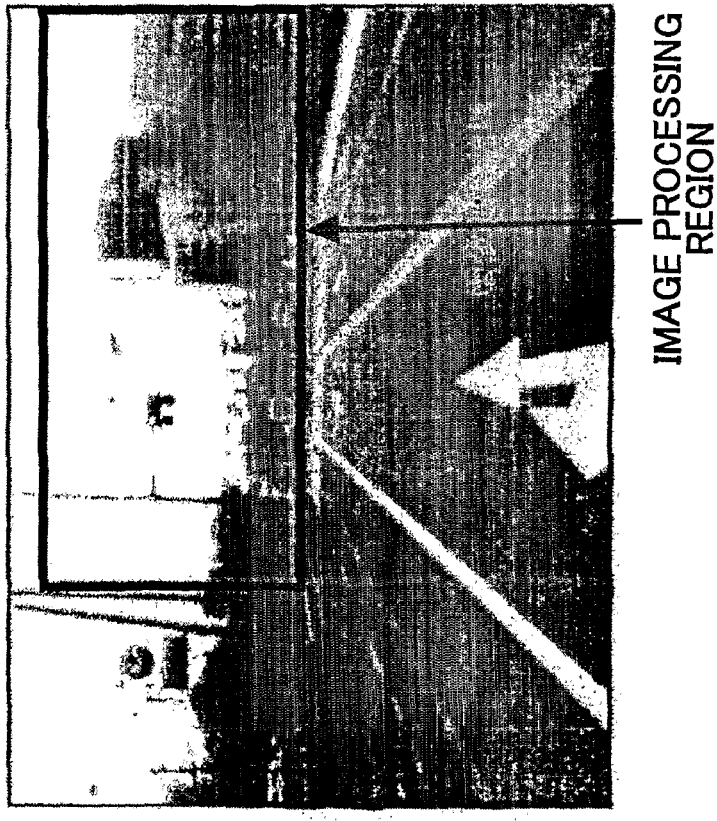
FIG. 17A and FIG. 17B are images captured when the vehicle is traveling on a road having a large width.
Figure 17B:
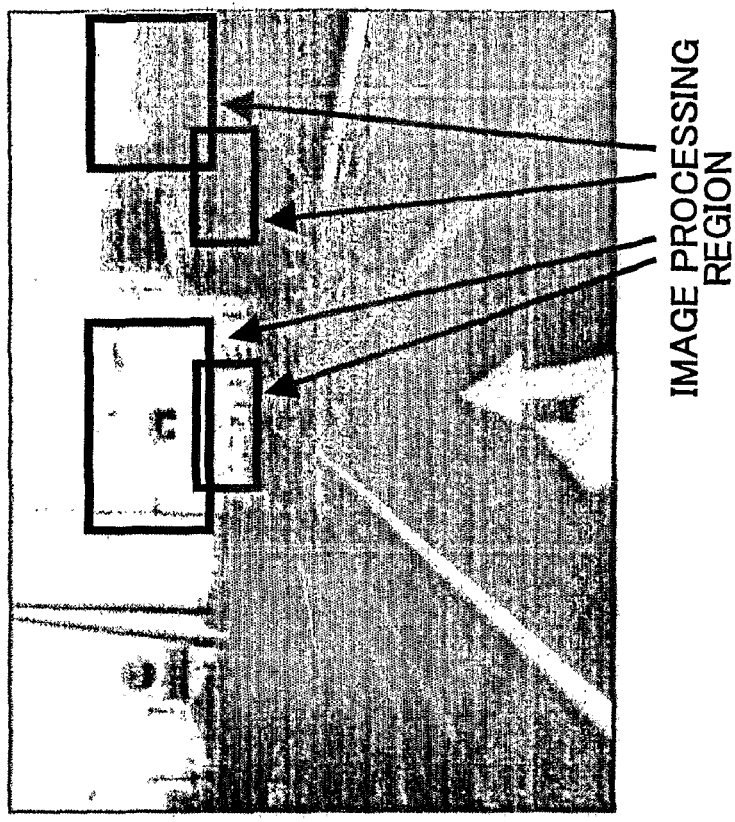

FIG. 17A and FIG. 17B are images captured when the vehicle is traveling on a wide road. This road has three lanes.

The region indicated by the frame in FIG. 17A is the search region set when image processing is performed over the entire region around the intersection.

Also, in FIG. 17B, a traffic signal is estimated to be located at each corner of the intersection (iv), and search frames are set accordingly, that is, four search frames are set.

Referring to FIG. 12B, when image processing is performed to the image shown in FIG. 17A and FIG. 17B, it takes 110 msec before detecting a traffic signal when searching of the traffic signal is performed over the entire region around the intersection, and 50 msec when the searching is performed using a search frame.

Figure 18B:
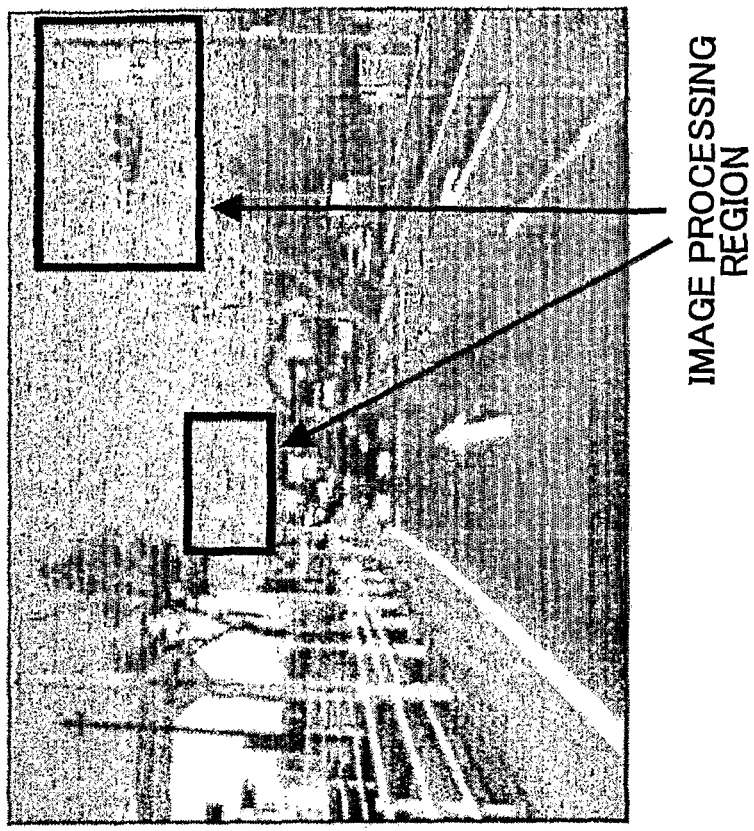
FIG. 18A and FIG. 18B are images captured when the vehicle is traveling on a curve.
Figure 18A:
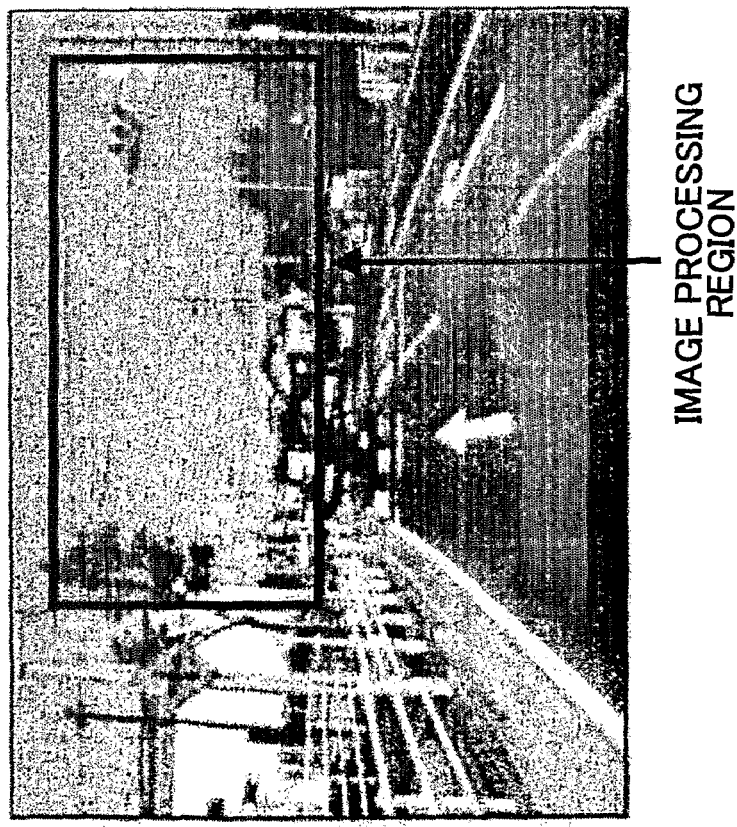

FIG. 18A and FIG. 18B each show an image captured when the vehicle is traveling on a curve.

The region indicated by the frame in FIG. 18A is the search region set when image processing is performed over the entire region around the intersection.

In FIG. 18B, a traffic signal is estimated to be located the offset distance L1 (offset) before the intersection (v) and a search frame is set accordingly.

Referring to FIG. 12C, when image processing is performed to the image shown in FIG. 18A and FIG. 18B, it takes 100 msec before detecting a traffic signal when searching of the traffic signal is performed over the entire region around the intersection, and 40 msec when the searching is performed using a search frame.

Figure 19A:
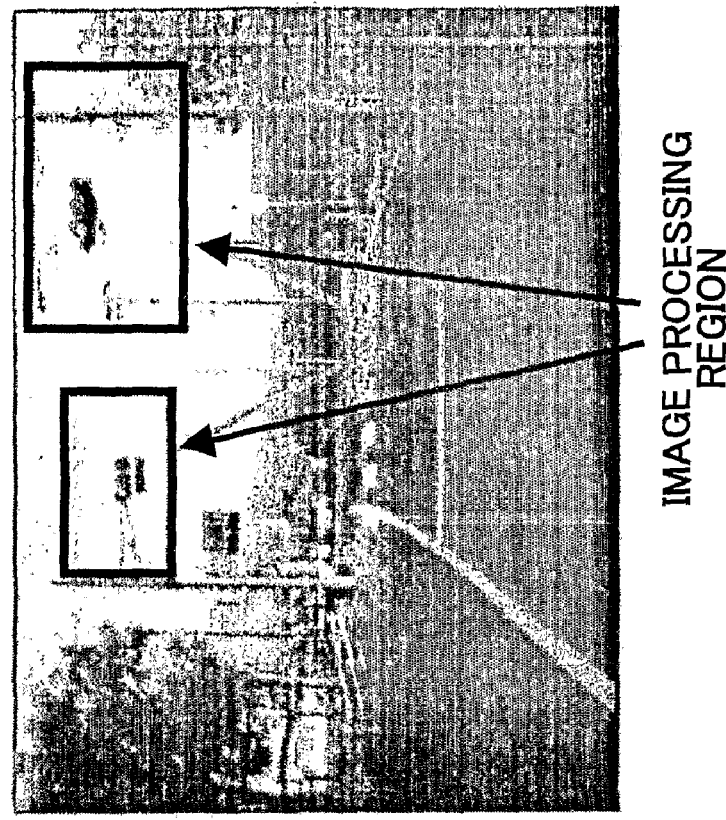
FIG. 19A and FIG. 19B are images captured when the vehicle is traveling on a slope.
Figure 19B:
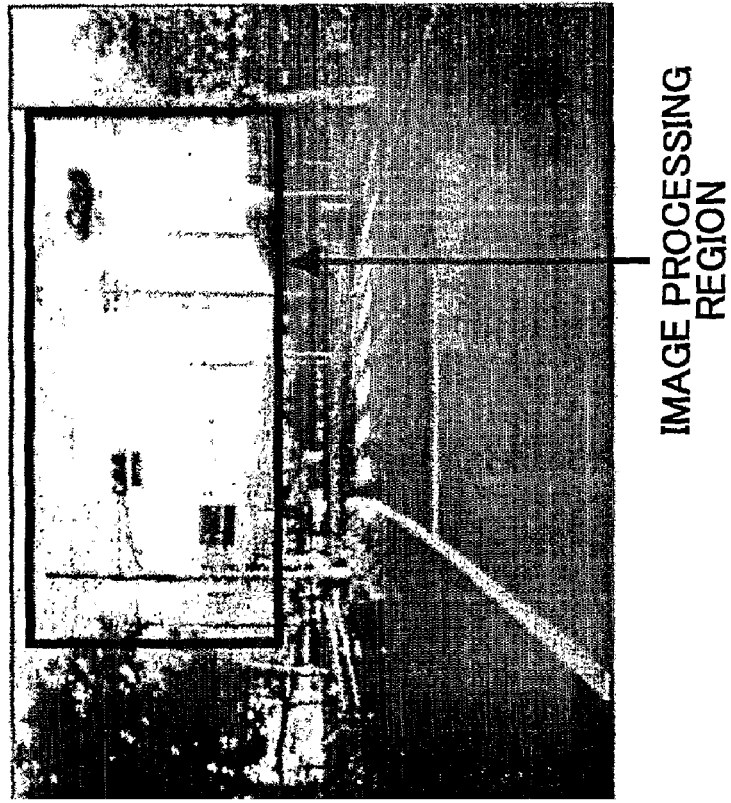

FIG. 19A and FIG. 19B each show an image captured when the vehicle is traveling on an inclined road.

The region indicated by the frame in FIG. 19A is the search region set when image processing is performed over the entire region around the intersection.

In FIG. 19B, a traffic signal is estimated to be located the offset distance L2 (offset) before the intersection (vi) and a search frame is set accordingly.

Referring to FIG. 12D, when image processing is performed to the image shown in FIG. 18A and FIG. 18B, it takes 100 msec before detecting a traffic signal when searching of the traffic signal is performed over the entire region around the intersection, and 45 msec when the searching is performed using a search frame.

According to the first exemplary embodiment of the invention, as evident from FIG. 12A to 12D, the time needed for image-processing for detecting a traffic signal is reduced by estimating the position of the traffic signal and setting a search frame accordingly.

Second Exemplary Embodiment

According to an image processing system of the second exemplary embodiment, the true coordinate of a traffic signal is calculated through predetermined calculations using, as an initial value, the position of the traffic signal which is estimated by the traffic signal position estimating portion 7 on the road map, and the calculated true coordinate of the traffic signal is recorded in a database. Note that the position of a traffic signal will be referred as "the coordinate of a traffic signal" where appropriate and the coordinate of each traffic signal is defined by the latitude, longitude, and altitude. According to this image processing system, because the true coordinate of a traffic signal is recorded in the database, the speed of image processing increases.

Figure 13:
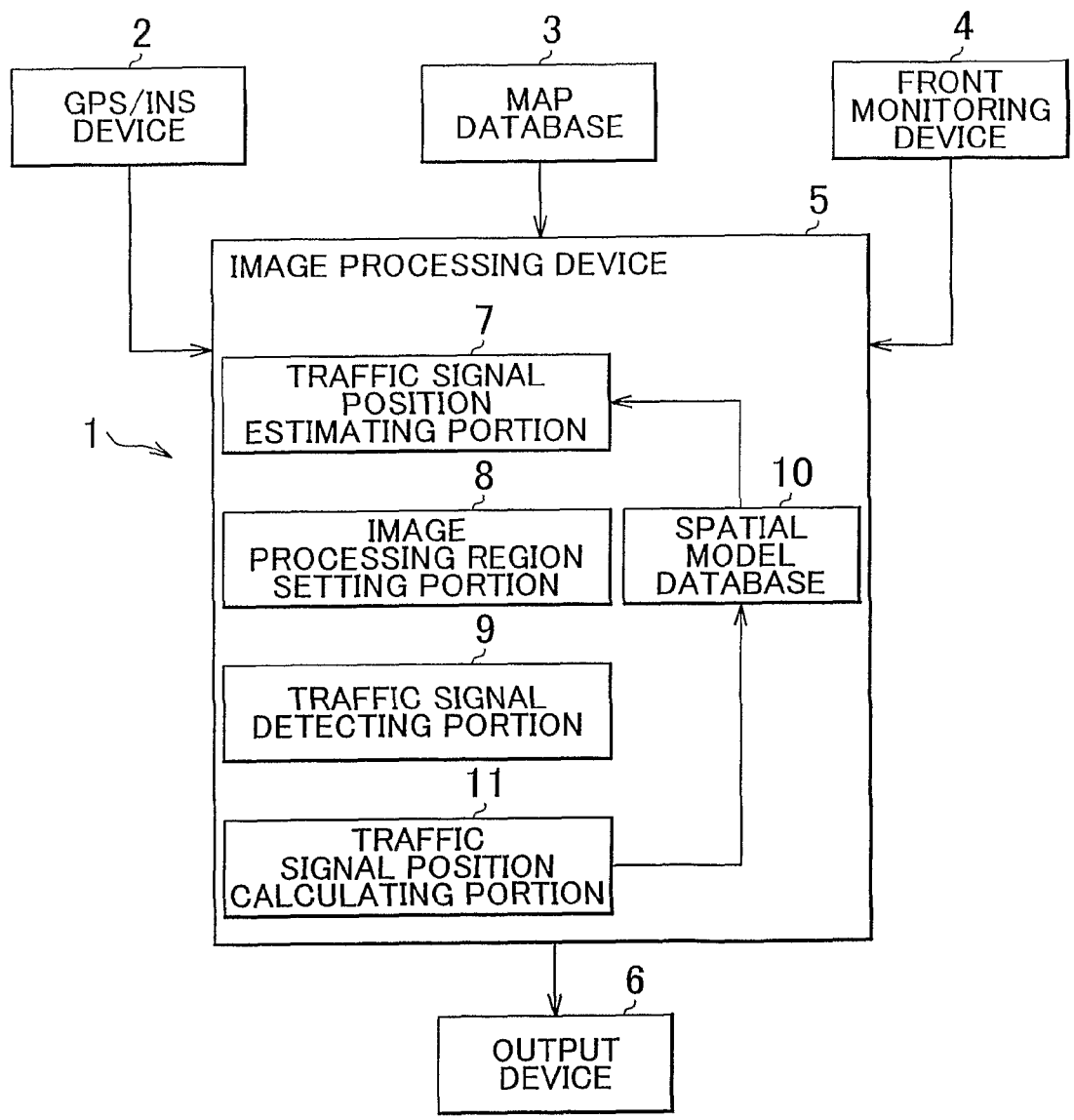
FIG. 13 is a view showing one example of the configuration of an image processing system according to the second exemplary embodiment.

FIG. 13 shows one example of the configuration of the image processing system according to the second exemplary embodiment. In FIG. 13, the components that are the same as those in FIG. 1 will be designated by the same numerals and their description will be omitted. The image processing system in FIG. 13 is different from that in FIG. 1 in that the image processing system in FIG. 13 includes a traffic signal position calculating portion 11 and a spatial model database 10.

The traffic signal position calculating portion 11 calculates the true coordinate of a traffic signal using, for example, a Kalman filter. The Kalman filter is a filter (algorithm) that is used to find the most appropriate estimated value, as a true value, from observed values including noises. More specifically, a Kalman filter is a state estimation type filter that applies, in calculation, the present estimated value to the previous estimated value so as to estimate a value closer to the true value. In the second exemplary embodiment, the true coordinate of a traffic signal is repeatedly calculated at each frame, using the values obtained from the captured images and based on the position and orientation of the vehicle.

Because the information regarding the position and orientation of the vehicle has been input to the traffic signal position calculating portion 11, when a traffic signal is detected from an image, the traffic signal position calculating portion 11 can determine the positional relationship in three dimensions between the vehicle and the traffic signal. Thus, the coordinate of the detected traffic signal can be determined from the position and the orientation of the vehicle. The position and orientation of the vehicle include errors and therefore the calculated coordinate of the traffic signal also includes errors. However, because images are continuously captured at a high rate, such as several tens of images in a second, it is considered that, as the estimation of the coordinate is thus repeated, the estimated coordinate approaches the true value. Also, if the coordinate that is finally recorded before the vehicle passes through the intersection is recorded, it is possible to use the recorded coordinate as an initial value when the vehicle passes through the same intersection next time, and this makes it possible to estimate a value closer to the true value.

A spatial mode database 10 is a database that records the coordinates of traffic signals calculated by the traffic signal position calculating portion 11. That is, the spatial model database 10 records the coordinates of traffic signal that are calculated when the vehicle passes through each intersection, associating each coordinate with the corresponding intersection node and the date and time at which the vehicle passed through the intersection. Thus, from next time the vehicle passes through the same intersection, the position of the traffic signal, when setting the image processing region, can be estimated more accurately using the recorded coordinate of the traffic signal.

Figure 14:
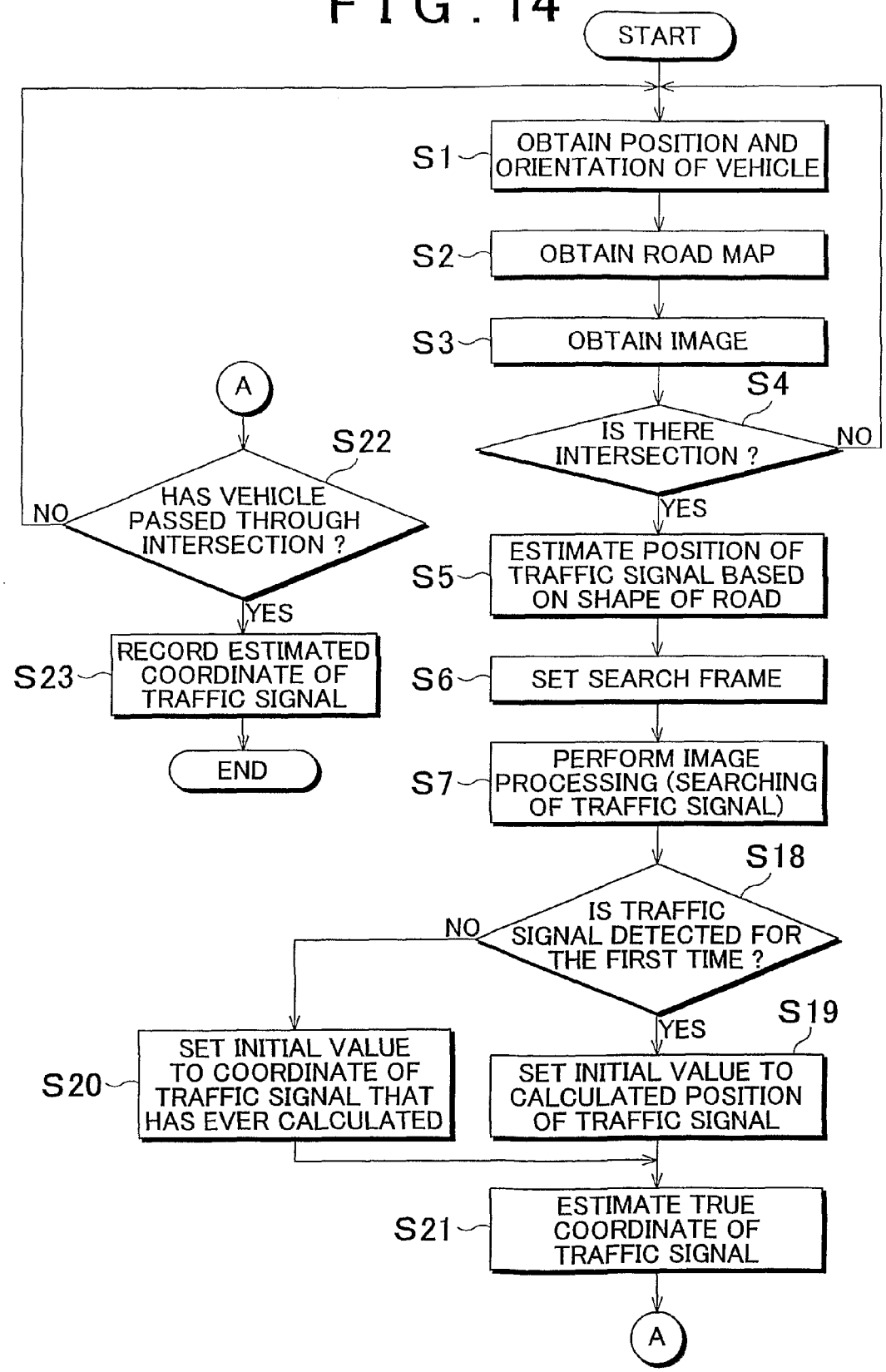
FIG. 14 is a flowchart showing a control routine that the image processing system executes to detect traffic signals.

FIG. 14 is a flowchart showing a control routine that the image processing system executes to detect traffic signals. In FIG. 14, the components that are the same as those in FIG. 11 will be designated by the same numerals.

When the vehicle is traveling, the GPS/INS device 2 obtains the position and orientation of the vehicle (S1). The image processing device 5 then obtains the road maps around the present position of the vehicle, especially the roads maps of the regions in the traveling direction of the vehicle (S2).

The front monitoring device 4 obtains images at a predetermined frame rate and outputs the images to the image processing device 5 (S3).

Next, the traffic signal position estimating portion 7 estimates the position of a traffic signal based on the shape of the road that is extracted from the road map. That is, the traffic signal position estimating portion 7 determines whether there is an intersection (S4), and if there is an intersection (S4: YES), the traffic signal position estimating portion 7 estimates the position of the traffic signal based on the width of the road, the width of the crossing road, the curvature of the road, the inclination of the road, and so on (S5).

After the position of the traffic signal is thus estimated, the image processing region setting portion 8 sets, in the image, a search frame that covers the region in which a traffic signal is estimated to be located (S6). If there are two or more estimated positions of the traffic signal, two or more search frames may be set based on the priorities assigned to the respective estimated positions.

The traffic signal detecting portion 9 detects the traffic signal from the search frame by template matching, or the like (S7).

Next, the traffic signal calculating portion 11 determines whether the detected traffic signal has been detected for the first time through image processing (S18). That is, the image data of this traffic signal is regarded as having been obtained for the first time, if the first image data of the traffic signal is detected in those images that have been continuously captured by the front monitoring device 4 when the vehicle passes through an intersection for the first time.

If it is determined that the image data of the traffic signal has been obtained for the first time (S18: YES), the traffic signal calculating portion 11 sets the coordinate of the traffic signal, which has been estimated in step S5, as the initial value for calculating the true coordinate of the traffic signal (S119). By thus setting the initial value, the traffic signal calculating portion 11 can more easily reach the true coordinate of the traffic signal through repetition of calculations.

The following are examples of a coordinate that is set as the foregoing initial value.

The coordinate of the position that is at the lateral center of the road and 5 m above the road surface (when the traffic signal is estimated to be above the road)

The coordinate of the position that is at an end of the intersection, at the lateral center of the road, and 5 m above the road surface (when traffic signals are estimated to be located before and after the intersection)

The coordinate of the position that is at an end of the intersection, at the lateral center of one lane of the road, and 5 m above the road surface (when the road is a wide road and the traffic signal is estimated to be located at each corner of the intersection)

The coordinate of the position that is the offset distance L1 before the intersection, at the lateral center of the road, and 5 m above the road surface (when the road is a curve)

The coordinate of the position that is the offset distance L2 before the intersection, at the lateral center of the road, and 5 m above the road surface (when the road is an inclined road)

The coordinate of the position that is at the lateral center of the road and 5 m above the road surface (when the road is a narrow road)

Back to the control routine, the traffic signal calculating portion 9 next calculates the true coordinate of the traffic signal (step 21). In this case, since the coordinate of the traffic signal has never been calculated, the traffic signal calculating portion 11 sets the initial value to the coordinate that has been estimated as the position of the traffic signal in step 5.

The traffic signal calculating portion 11 sets the initial value to the coordinate estimated in accordance with the shape of the road (S19), and calculates the true coordinate of the traffic signal based on the position and orientation of the vehicle and the position of the traffic signal in the image (S21).

If it is determined that the image data of the traffic signal has ever been obtained (S18: NO), the traffic signal calculating portion 11 repeatedly calculates the true coordinate of the traffic signal by applying, in calculation, the present position and orientation of the vehicle and the position of the traffic signal in the image to the coordinate of the traffic signal that has already been estimated (S21).

Next, the image processing device 5 determines whether the vehicle has passed the intersection (S10). This determination is made based on the position of the vehicle that has been obtained from the GPS/INS device 2.

If it is determined in step 22 that the vehicle has not yet passed through the intersection (S22: NO), the control goes back to step 1 and repeats the searching of the traffic signal and the calculation of the true coordinate of the traffic signal.

On the other hand, if it is determined in step 22 that the vehicle has already passed through the inter section (S22: YES), the image processing device 5 records the estimated coordinate of the traffic signal into the spatial model database (S23), after which the control routine of the flowchart in FIG. 14 ends.

Figure 15A:
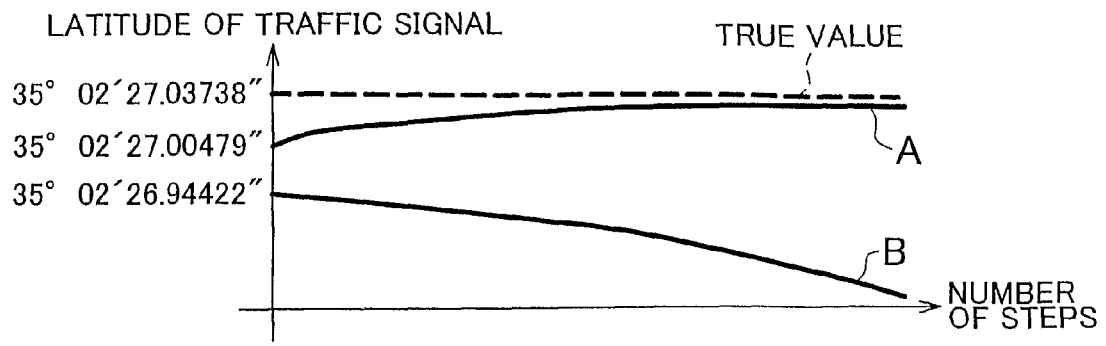
FIG. 15A, FIG. 15B and FIG. 15C show examples for illustrating the number of steps and the calculation result of the coordinate of a traffic signal.
Figure 15B:
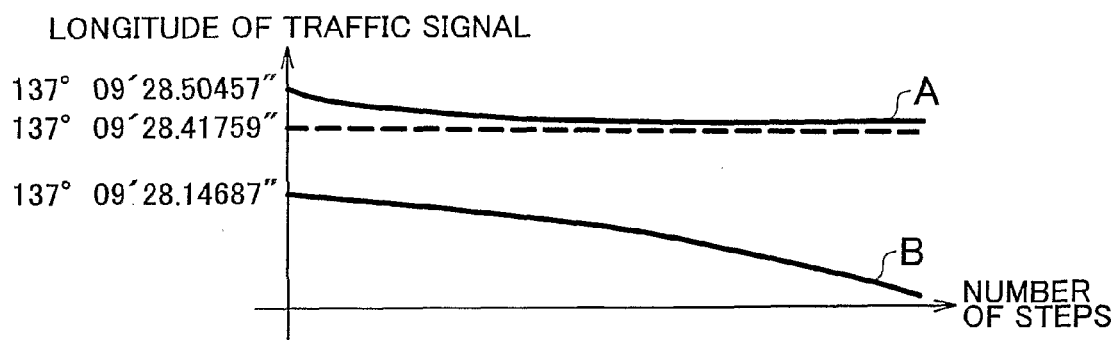
Figure 15C:
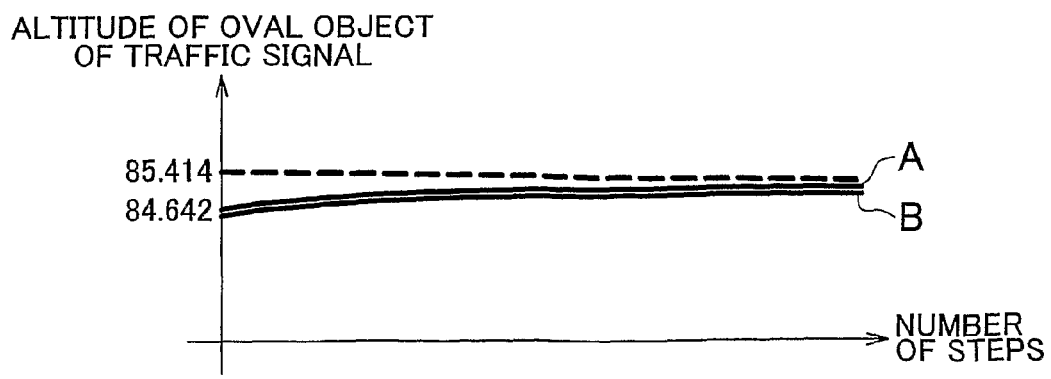

Result of detection of traffic signals in the secondary exemplary embodiment FIG. 15A, FIG. 115B, and FIG. 15C represent an example of a calculation result of the coordinate of a traffic signal according to the number of steps. More specifically, FIG. 15A represents the relation between the number of steps and the latitude, and FIG. 15B represents the relation between the number of steps and the longitude, and FIG. 15 C represents the relation between the number of steps and the altitude.

In each of FIG. 15A, FIG. 15B, and FIG. 15C, the dotted line represents the true coordinate of the traffic signal that is obtained through an actual measurement, and line A represents the coordinate of the traffic signal that is calculated using the estimated position of the traffic signal as the initial value, and line B represents the coordinate of the traffic signal that is calculated using the position at the node of the intersection and 5 m above the road surface as the initial value.

As shown in FIG. 15A, FIG. 15B, and FIG. 15C, when the node of the intersection is used as the initial value, the calculation of the longitude and latitude may diverge. On the other hand, when the estimated position of the traffic signal is used as the initial value, the calculated values approach the true values through repetition of the calculation.

As described above, the image processing system according to the second exemplary embodiment can prevent divergence of calculations by using an estimated position of the traffic signal as the initial value and thus accurately calculates the true coordinate of the traffic signal. When the coordinate of the traffic signal is accurately calculated, the size of the search region of the image can be reduced presuming that the traffic signal is located at the estimated coordinate, and therefore the traffic signal can be detected promptly.

The invention claimed is:

1. An image processing system, comprising:
 a front monitoring device that obtains an image of a view ahead of a vehicle;
 a vehicle position detecting device that detects a position and an orientation of the vehicle;
 a map database that stores a road map;
 a traffic indicator position estimating portion that estimates a position of a traffic indicator based on a shape of an intersection ahead of the vehicle that has been extracted from the map database, according to the position of the vehicle that has been detected by the vehicle position detecting device;
 an image processing region setting portion that sets, within the image obtained by the front monitoring device, an image processing region over which a predetermined image processing is performed, based on the position of the traffic indicator that has been estimated by the traffic indicator position estimating portion; and
 a traffic indicator detecting portion that detects the traffic indicator from the image processing region through the predetermined image processing;
 wherein the traffic indicator position estimating portion calculates the position of the traffic indicator based on a curvature of a road before the intersection ahead of the vehicle that has been extracted from the map database, according to the position of the vehicle that has been detected by the vehicle position detecting device, or based on an inclination of the road before the intersection.

2. The image processing system according to claim 1, wherein
when the shape of the road indicates an intersection, the traffic indicator position estimating portion estimates a traffic indicator or traffic indicators to be located:
a) above a road on which the vehicle is traveling;
b) before and after the intersection, respectively, as viewed in the traveling direction of the vehicle;
c) before and after the intersection, respectively, across a crossing road, as viewed in the traveling direction of the vehicle;
d) within a predetermined distance from each corner of the intersection;
e) before the intersection by a distance that is determined in accordance with a curvature of a curve, as viewed in the traveling direction of the vehicle;
f) before the intersection by a distance that is determined in accordance with an inclination of a road, as viewed in the traveling direction of the vehicle; or
g) substantially at the lateral center of a road on which the vehicle is traveling.

3. The image processing system according to claim 1, wherein the image processing region is set based on the width of a road on which the vehicle is traveling.

4. The image processing system according to claim 1, further comprising:
an output device that displays the image of the view ahead of the vehicle and a textual information for a driver, wherein a speaker is connected to the output device, and the speaker outputs an alert when the traffic indicator detecting portion detects the traffic indicator.

5. The image processing system according to claim 1, further comprising:
a traffic indicator position calculating portion that calculates a coordinate of the position of the traffic indicator, wherein
the traffic indicator position calculating portion calculates the coordinate of the position of the traffic indicator using, as an initial value, the position of the traffic indicator that has been estimated by the traffic indicator position estimating portion, based on the position and orientation of the vehicle that have been detected by the vehicle position detecting device and the position of the traffic indicator in the image that has been detected by the traffic indicator detecting portion.

6. The image processing system according to claim 5, further comprising:
a spatial model database that records the coordinate of the position of the traffic indicator that has been calculated by the traffic indicator position calculating portion, wherein
if the coordinate of the position of the traffic indicator is recorded in the spatial model database, the recorded coordinate is set as the initial value in the calculation by the traffic indicator position calculating portion.

7. The image processing system according to claim 1, wherein the traffic indicator includes a traffic signal.

8. An image processing method, comprising:
obtaining an image of a view ahead of a vehicle; detecting a position and an orientation of the vehicle;
extracting a shape of an intersection ahead of the vehicle from a road map database that pre-stores a road map, based on the detected position of the vehicle;
estimating a position of a traffic indicator based on a shape of a road;
setting an image processing region over which a predetermined image processing is performed, based on the estimated position of the traffic indicator; and
detecting the traffic indicator from the image processing region through the predetermined image processing;
wherein estimating a position of a traffic indicator includes calculating the position of the traffic indicator based on a curvature of a road before the intersection ahead of the vehicle that has been extracted from the map database, according to the position of the vehicle that has been detected, or based on an inclination of the road before the intersection.

9. The image processing system according to claim 2, further comprising:
a traffic indicator position calculating portion that calculates a coordinate of the position of the traffic indicator, wherein
the traffic indicator position calculating portion calculates the coordinate of the position of the traffic indicator using, as an initial value, the position of the traffic indicator that has been estimated by the traffic indicator position estimating portion, based on the position and orientation of the vehicle that have been detected by the vehicle position detecting device and the position of the traffic indicator in the image that has been detected by the traffic indicator detecting portion.

* * * * *